United States Patent [19]

Yamada

[11] Patent Number: 5,241,397
[45] Date of Patent: Aug. 31, 1993

[54] IMAGE FORMING APPARATUS IN WHICH THE ORDER OF PRINTING IN DUPLEX-PRINTING IS CONTROLLED IN ACCORDANCE WITH MEMORY STORAGE CAPACITY

[75] Inventor: Tatsutoshi Yamada, Toyokawa, Japan

[73] Assignee: Minolta Camera Kabushiki Kaisha, Osaka, Japan

[21] Appl. No.: 804,812

[22] Filed: Dec. 9, 1991

[30] Foreign Application Priority Data

Dec. 11, 1990 [JP] Japan .................................. 2-410274

[51] Int. Cl.⁵ .......................... H04N 1/21; B41J 13/00
[52] U.S. Cl. .................................... 358/296; 358/404; 358/444; 395/115; 395/116; 355/319; 355/321
[58] Field of Search ............... 358/296, 300, 302, 401, 358/404, 407, 442, 444; 355/319, 321, 26; 271/301, 303, 65; 395/115, 116

[56] References Cited

U.S. PATENT DOCUMENTS

| | | | |
|---|---|---|---|
| 4,945,390 | 7/1990 | Hasegawa | 355/319 |
| 4,958,232 | 9/1990 | Sugiura | 358/300 |
| 4,978,980 | 12/1990 | Noguchi et al. | |
| 5,077,787 | 12/1991 | Masatomo | |

Primary Examiner—Edward L. Coles, Sr.
Assistant Examiner—Scott A. Rogers
Attorney, Agent, or Firm—Willian, Brinks, Olds, Hofer, Gilson, Lione

[57] ABSTRACT

An image forming apparatus in accordance with the present invention forms images on the opposing planes of a sheet of paper based on image data sequentially transmitted on page-by-page basis, and includes a memory for storing image data on page-by-page basis, an image forming device for forming an image on a sheet of paper based on image data read out from the memory, a face up tray attachable and detachable to and from the body of the apparatus and capable of receiving a sheet of paper with its plane on which an image is formed last facing upward, and a controller changing the order of reading image data from the memory based on the storage capacity of the memory and whether or not the face up tray is mounted to the apparatus.

17 Claims, 31 Drawing Sheets

FIG.46
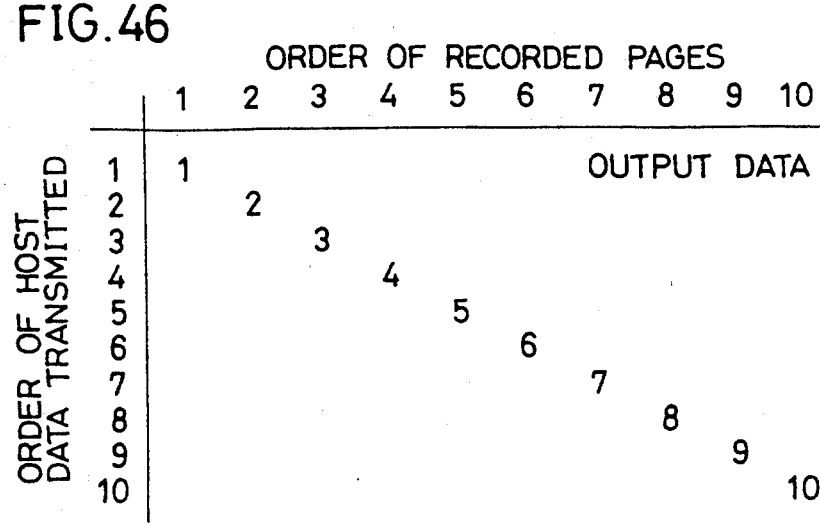
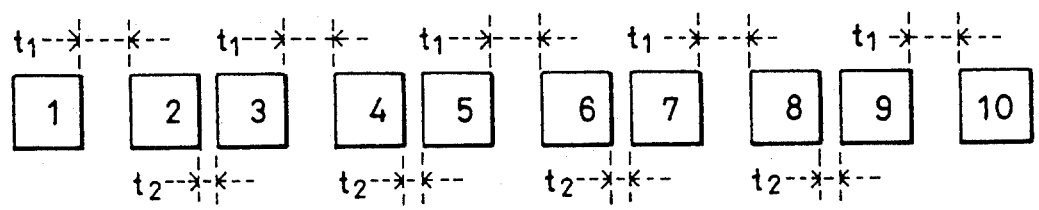
FIG.47
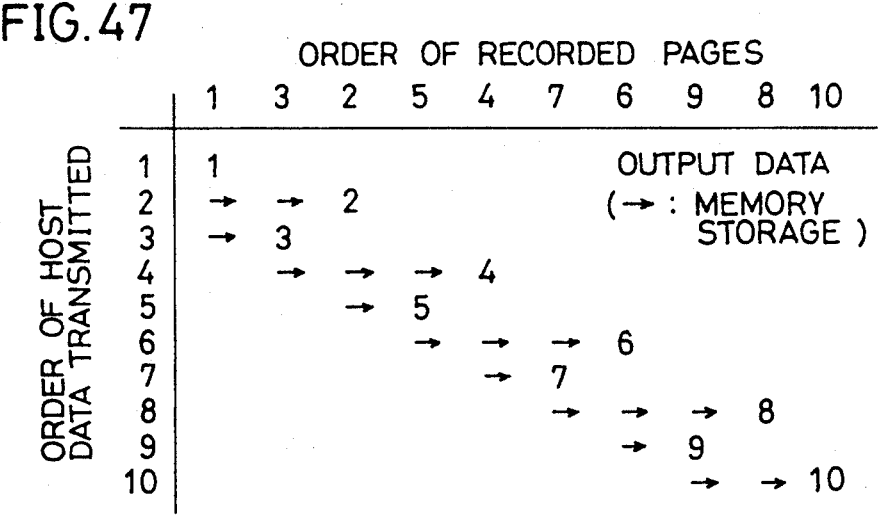
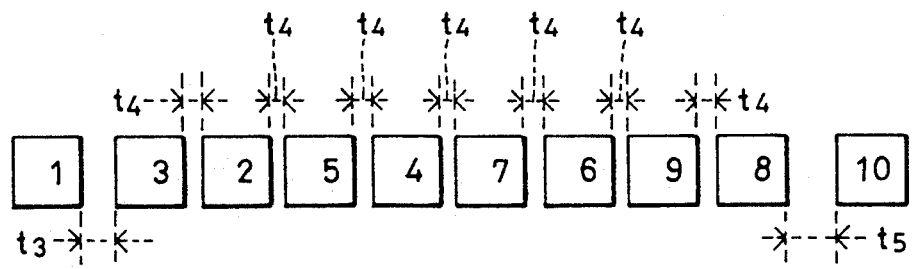

IMAGE FORMING APPARATUS IN WHICH THE ORDER OF PRINTING IN DUPLEX-PRINTING IS CONTROLLED IN ACCORDANCE WITH MEMORY STORAGE CAPACITY

BACKGROUND OF THE INVENTION

1. Field of the Invention

The present invention relates generally to a printer, and more specifically, to a duplex printer capable of printing on the first and second planes of a sheet of recording paper.

2. Description of the Related Art

A duplex printer with a switch back mechanism is being provided.

U.S. Pat. No. 4,978,980 discloses a method of minimizing an entire time period required for printing in the duplex mode in a duplex printer including a switch-back mechanism, a face up tray, and a face down tray. More specifically, a method of obtaining hard copies of sheets of recording papers in the order of the pages each for the minimum time period by printing the sheets in the order of the pages represented by:

$$1 \to 3 \to 2 \to 5 \to 4 \to 7 \to 6 \to 9 \to 8 \to 10,$$

when the sheets are discharged onto the face up tray, while by printing in the order of the pages represented by:

$$2 \to 4 \to 1 \to 6 \to 3 \to 8 \to 5 \to 10 \to 7 \to 9,$$

when the sheets are discharged onto the face down tray.

The face up tray is a tray for accommodating sheets of recording paper with images already formed thereon, with the first plane facing upward in the one-side mode and with the second plane facing upward in the duplex mode. This is for the purpose of obtaining hard copies in the order of the pages in the duplex mode, but the tray should be attached to the side of a printer for discharging a sheet of recording paper in a manner as stated above, making it difficult to install the printer in a small space.

The face down tray in contrast is a tray for accommodating with the first plane side facing downward in the one side mode and with the second plane side facing downward in the duplex mode. This is for the purpose of obtaining hard copies in the order of the pages in the one-side mode, and the tray is of a structure which can be placed on the top of casing of printer, thereby permitting placing of the printer even in a small space.

In a printer, an image is formed on a sheet of recording paper based on image data read out from a memory. Memory storage capacities are different among printers of different kinds, and even among printers of the same kind, memory storage capacities are different when memories are additionally provided as options.

A method disclosed in Japanese Patent Laying-Open No. 63-313172 requires a storage capacity for 2 pages when a face up tray is used, and requires a storage capacity for 3 pages when a face down tray is used. Accordingly, if the memory does not have a necessary storage capacity, duplex printing cannot be conducted.

SUMMARY OF THE INVENTION

It is therefore an object of the present invention to efficiently form images on the opposing planes of a sheet of paper in an image forming apparatus.

Another object of the present invention is to minimize time required for forming images onto the opposing planes of a sheet of paper in accordance with the storage capacity of a storage device in an image forming apparatus.

Yet another object of the present invention is to enable forming of images onto the opposing planes of a sheet of paper when the storage capacity of a storage device in an image forming apparatus is small.

A still further object of the present invention is to facilitate selection of discharge trays upon forming images onto the opposing planes of a sheet of paper when a plural kinds of discharge trays exist in an image forming apparatus.

In order to achieve the above-described objects, an image forming apparatus in accordance with an aspect of the present invention forms images on the opposing planes of a sheet of paper based on the image data sequentially output on page-by-page basis, and includes storage means for storing image data on page-by-page basis, image forming means for forming images on a sheet of paper based on the image data to be read out from the storage means, and changing means for changing the order of image data to be read out from the storage means based on the storage capacity of the storage means.

An image forming apparatus having such a structure changes the order of image data to be read out based on the storage capacity of the storage means and therefore permits efficient image formation.

In order to achieve the above-described objects, an image forming apparatus in accordance with another aspect of the present invention forms images on the opposing planes of a sheet of paper based on image data sequentially output on page-by-page basis, and includes storage means for storing image data on page-by-page basis, image forming means for forming an image on a sheet of paper based on the image data read out from the storage means, first paper feeding means for feeding a sheet of paper in which no image is formed with its first plane as an image forming plane to the image forming means, second paper feeding means for feeding the sheet of paper in which an image is formed on its first plane with its second plane as an image forming plane to the image forming means, a first paper discharge tray attachable and detachable to and from the body of the apparatus and capable of receiving the sheet with the first plane facing upward, a second paper discharge tray capable of receiving the sheet in which the image is formed with the first plane facing downward, switching means for switching between the first paper discharge tray, second paper discharge tray and image forming means where to feed the sheet of paper in which the image is formed, and control means for controlling the image forming means, first-paper feeding means, second paper feeding means and switching means so as to minimize time required for forming images in accordance with all the output image data based on whether or not the first paper discharge tray is mounted in the apparatus.

In an image forming apparatus having a structure as stated above, the image forming means and others are controlled so as to minimize time required for forming an image based on whether or not the first paper discharge tray is mounted, and, therefore, efficient image forming in accordance with the storage capacity of the storage means can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 46 is a representation showing the order in which page data are read out and time intervals for printing when sheets of recording paper are discharged onto the face up tray when duplex printing is conducted with a memory capacity of 1 page by the printer in accordance with the first and second embodiments;

FIG. 47 is a representation showing the order of reading page data and time intervals for printing when the sheets of recording paper are discharged onto the face up tray, when duplex printing is conducted with a memory capacity of 2 pages by the printer in accordance with the first and second embodiments;

DESCRIPTION OF THE PREFERRED EMBODIMENTS

One embodiment of the present invention will be described in conjunction with the drawings.

(1) Mechanism of Printer

Figure 1:
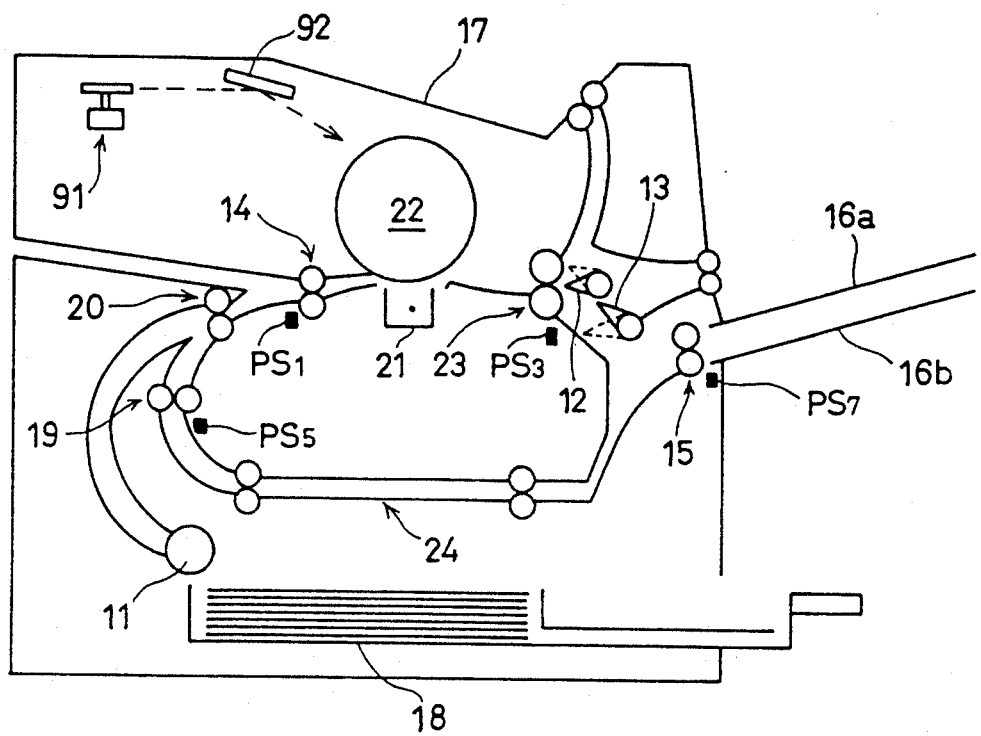
FIG. 1 is a view schematically showing a mechanism of a printer in accordance with first and second embodiments of the present invention.
Figure 2:
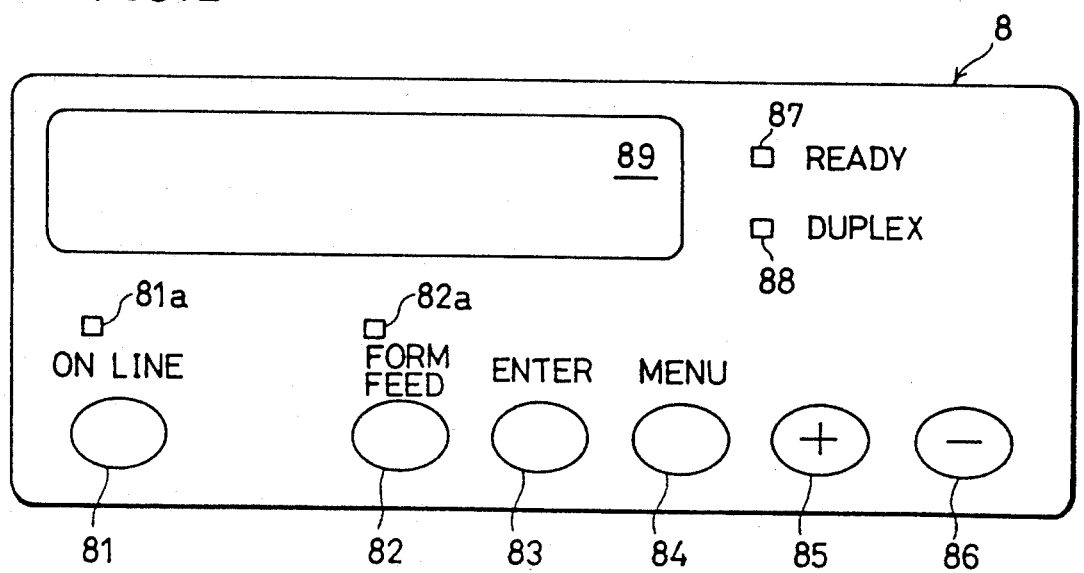
FIG. 2 is a view for illustrating the operation panel of the printer in accordance with the first and second embodiments.

FIG. 1 is a view schematically showing the mechanism of a printer in accordance with first and second embodiments, and FIG. 2 is a view for illustrating the operation panel of the printer.

The printer in accordance with the present invention is structured as a laser printer.

More specifically, as shown in FIG. 1, laser light modulated by an image signal and then output from a laser exposure device 91 is guided onto the surface of a photoreceptor drum 22 by an optics such as a reflection mirror 92. The photoreceptor drum 22 rotates at a constant speed, and is uniformly charged by a charger (not shown) before the exposure position. An electrostatic latent image corresponding to the above-described image signal is formed on the surface of the photoreceptor drum 22, and the electrostatic latent image is toner-developed by a developing unit to be visualized. A large number of sheets of recording paper are housed in a paper tray 18. The sheets of recording paper are sorted one by one by paper feed rollers 11, fed to the position of timing rollers 14 by guide rollers 20, etc., and then fed between photoreceptor drum 22 and a transfer charger 21. The above-stated toner image is transferred onto the sheet of recording paper.

The toner image transferred onto the sheet of recording paper is then subjected to fixing processing by heat rollers 23. Then, the sheet of recording paper is discharged onto a face down tray (FDT) 17 or a face up tray (FUT) 16a, or is sent to the side of duplex rollers 15 for recording an image onto the back side plane of the sheet.

Whether the sheet of recording paper after the fixing processing is discharged onto face down tray (FDT) 17 or face up tray (FUT) 16a, or sent to duplex rollers 15 is switched by operating the set positions of guide plates 12 and 13.

More specifically, when guide plate 12 is set at the lower position (the position indicated by the solid line in the figure), the sheet of recording paper is guided by the upper surface of guide plate 12 and discharged onto face down tray (FDT) 17.

When guide plate 12 is set at the upper position (the position indicated by the broken line in the figure) and guide plate 13 is set at the lower position (the position indicated by the broken line in the figure), the sheet of paper is guided by the lower surface of guide plate 12 and the upper surface of guide plate 13 and discharged onto face up tray (FUT) 16a.

When guide plate 12 is set at the upper position (the position indicated by the broken line in figure) and guide plates 13 is set at the upper position (the position indicated by the solid line in the figure), the sheet of recording paper is guided by the lower surfaces of guide plates 12 and 13, and is sent to the side of duple rollers 15.

Switching control of the setting positions of guide plates 12 and 13 is executed to in accordance with a selected mode, etc., detailed description of which will be provided later.

The above-stated duplex rollers 15 are rollers for supplying a sheet of paper on one plane (the first plane of which an image is fixed into a paper re-supply path 24 with the image plane facing upward.

More specifically, duplex rollers 15 supply the sheet of recording paper sent from heat rollers 23 with its tip end side first into a hollow portion formed of the above face up tray (FUT) 16a and midway tray plate 16b provided underneath, and then once stops with the trailing edge of the sheet of recording paper held therebetween. At that time, the sheet of recording paper is hidden from the outside by face up tray (FUT) 16a and midway tray plate 16b. The sheet of paper to be supplied into the re-paper feed path 24 would not be extracted by mistake against the holding stress of duplex rollers 15.

The above-stated face up tray (FUT) 16a and midway tray plate 16b provided underneath are integrally formed and are detachable from the body of the printer. Therefore, when the space for installing the printer is small, removal of these components creates the space for installing the printer. Also, upon the occurrence of a jam, detaching thereof permits the jammed paper to be readily removed.

Then, the above-stated duplex rollers 15 start rotating reversely. Thus, the above-stated sheet of recording paper with its image plane facing upward is guided and supplied with the above-stated trailing edge side of the sheet of recording paper first into the above-stated re-paper feed path 24.

The sheet of recording paper sent into the re-paper feed path 24 is then fed to the position of timing rollers 14 with the above-stated trailing edge side of the sheet of recording paper first by guide rollers 19, etc. Thus, recording of an image onto the back side plane (the second plane) of the recording paper is permitted.

In the figure, PS1, PS3, and PS5 are sensors for detecting the passage of the sheet of recording paper immediately before timing rollers 14, immediately after heat rollers 23, and immediately before guide rollers 19 in the re-paper feed path, respectively, and PS7 is a sensor (FUT detecting device) for detecting whether or not face up tray (FUT) 16a and midway tray plate 16b are mounted to the printer body.

The operation panel 8 shown in FIG. 2 is provided on the top of the casing of the present printer.

Provided on panel 8 are on-line key 81 for switching on-line/off-line with a host (computer, word processor, etc.), an LED for on-line indication 81a switching on and off for indicating the state of on-line with the host, a form feed key 82 for instructing printing out of data stored in the present printer, an LED 82a for form feed indication switching on and off for indicating that the data is stored in the present printer, a menu key 84 for instructing a menu selection mode in which a menu selection picture plane is displayed on a liquid crystal display panel 89 by accessing the menu of the print modes, a plus key 85 and minus key 86 for shifting items to be displayed on the menu selection picture plane, an enter keys 83 for instructing saving of an item displayed on the menu selection picture plane, a liquid crystal display panel 89 for indicating various picture planes such as menu selection picture plane, etc., an LED 87 for printer ready indication switching on and off for indicating the state in which the printer is ready, and an LED 88 for duplex mode indication switching on and off for indicating the state in which the duplex mode is set.

(2) Structure of Control Circuit

FIGS. 3-6 are block diagrams each showing a structure of a control circuit of a printer in accordance with the first embodiment of the present invention.

(2-1) Entire Structure

Figure 3:
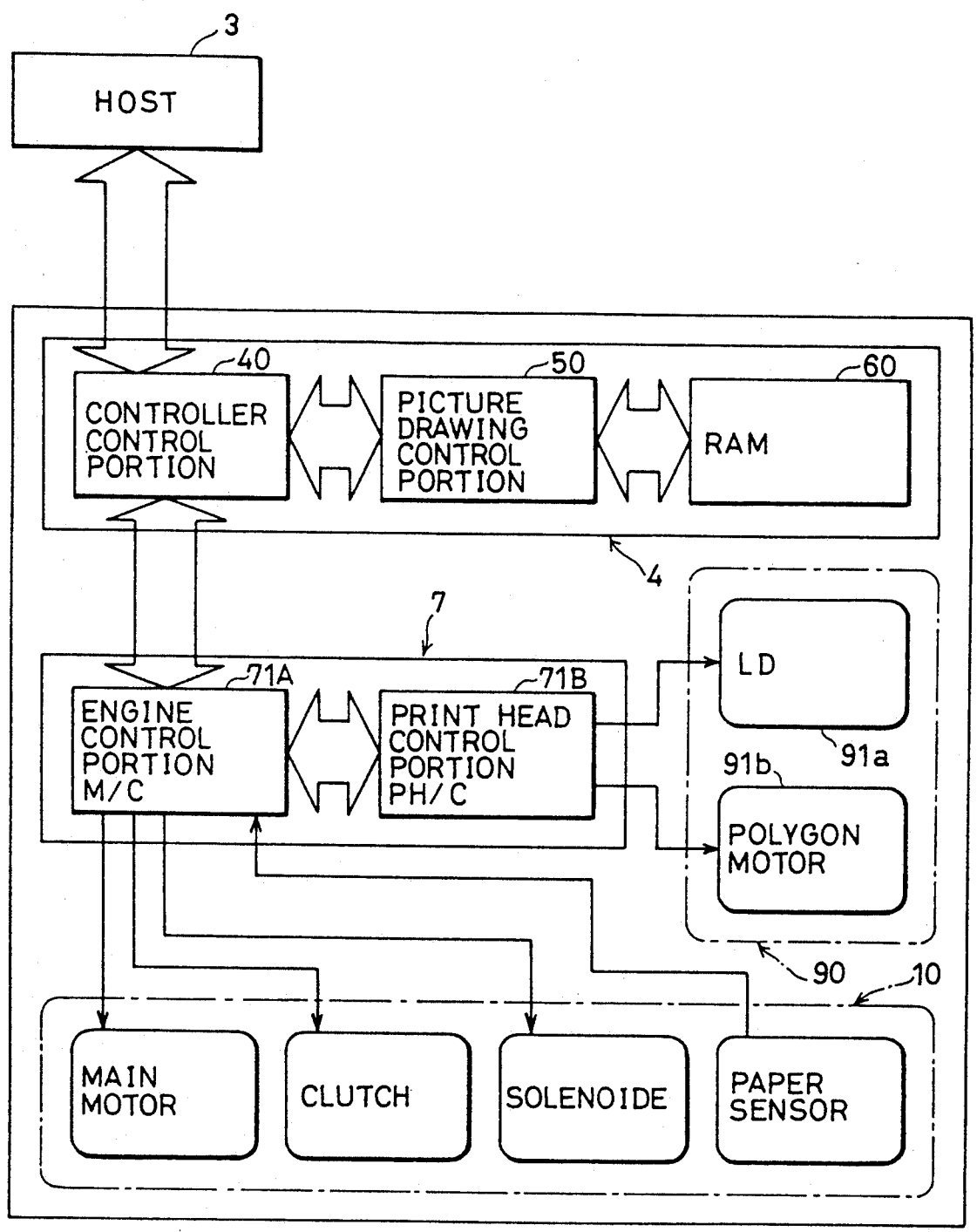
FIG. 3 is a block diagram showing the entire structure of the control circuit of the printer in accordance with the first and second embodiments.

As shown in FIG. 3, the control circuit of the present printer includes a controller 4, and an engine portion 7.

Controller portion 4 is formed of a controller control portion 40 and picture drawing control portion 50, and is provided with a RAM 60 used in processing in these two control portions. Controller portion 4 processes incoming data (image data, character data, and graphic data) transmitted from host 3 and format control cord (cords for setting modes, etc.) and transmits the processed data to engine portion 7.

Engine portion 7 is formed of an engine control portion (M/C) 71A which controls the operation of various components of a printer engine (main motor, clutch, solenoid, etc.), takes up and processes signals from various sensors (sensors PS1--PS7, etc.) provided inside the printer engine, and a print head control portion (PH/C 71B which controls the operation of optics (a laser diode 91a, a polygon motor 91b, etc.).

In the above-stated control circuit, the incoming data transmitted from host 3 is first input into controller control portion 40.

Controller control portion 40 conducts prescribed processing to the image data to be transmitted, makes picture drawing control portion 50 draw a picture, and executes processings such as setting of the printer, or setting of a format for font.

Picture drawing control portion 50 also draws the picture of the incoming image data transmitted from controller control portion 40 and then transmit the picture by one line to engine portion 7.

Engine portion 7 controls the operation of the present printer based on incoming various kinds of data transmitted from controller portion 4.

(2-2) Detailed Description of Control (Function) Blocks

Figure 4:
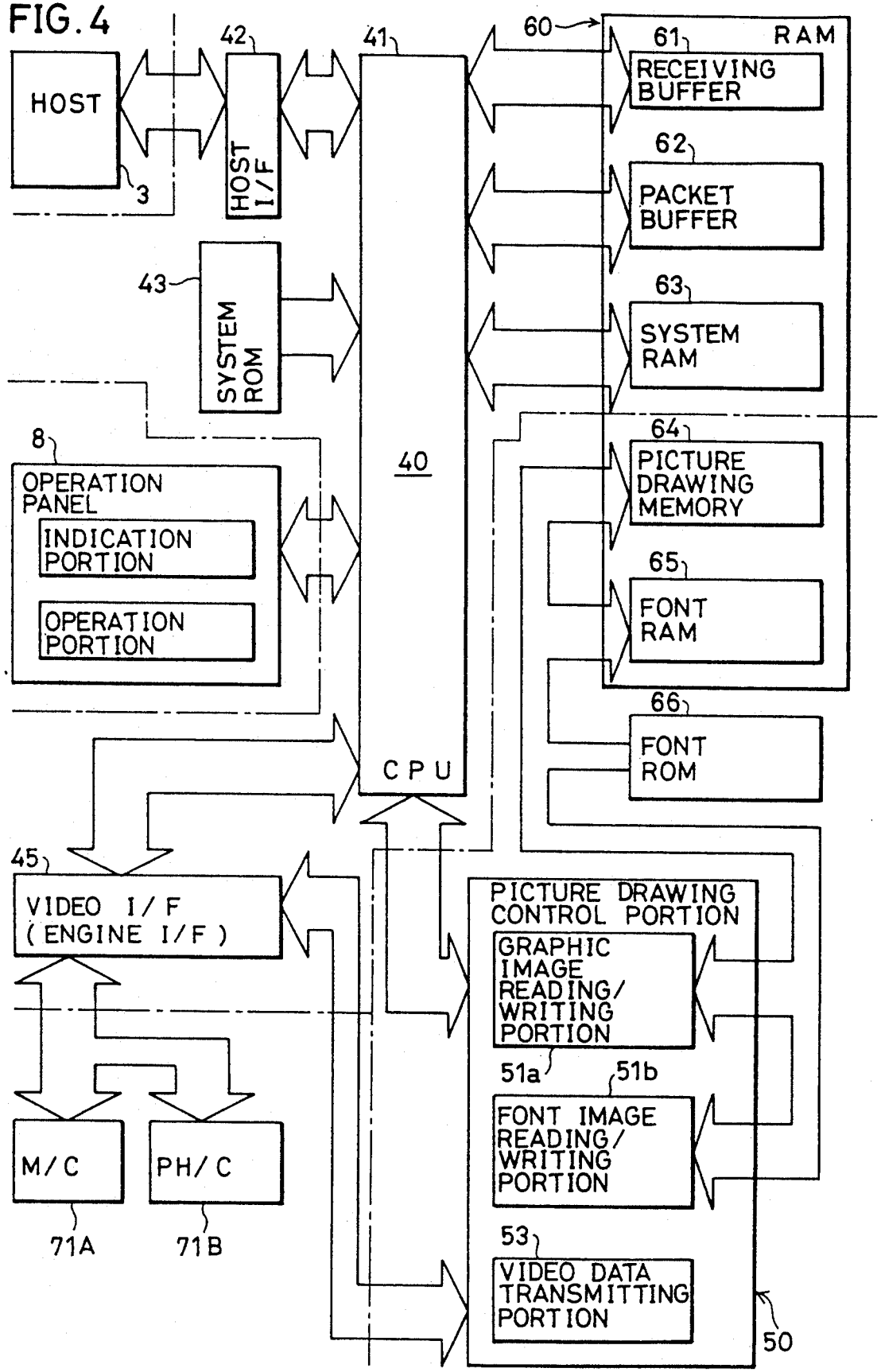
FIG. 4 is a block diagram showing in detail the structure of the control circuit of the printer in accordance with the first and second embodiments.
Figure 5:
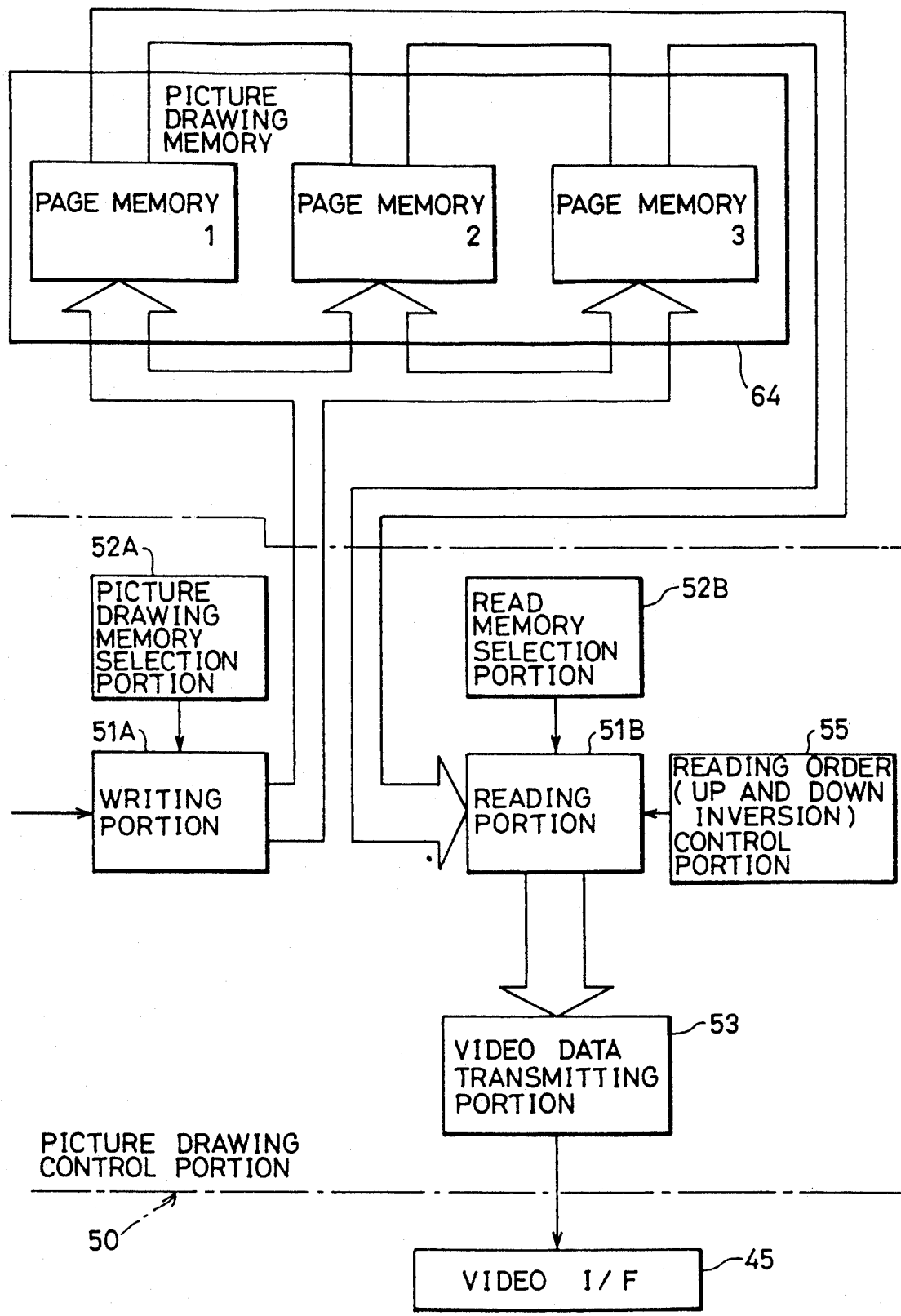
FIG. 5 is a block diagram showing a function of the picture drawing control portion of the control circuit of the printer in accordance with the first and second embodiments.
Figure 6:
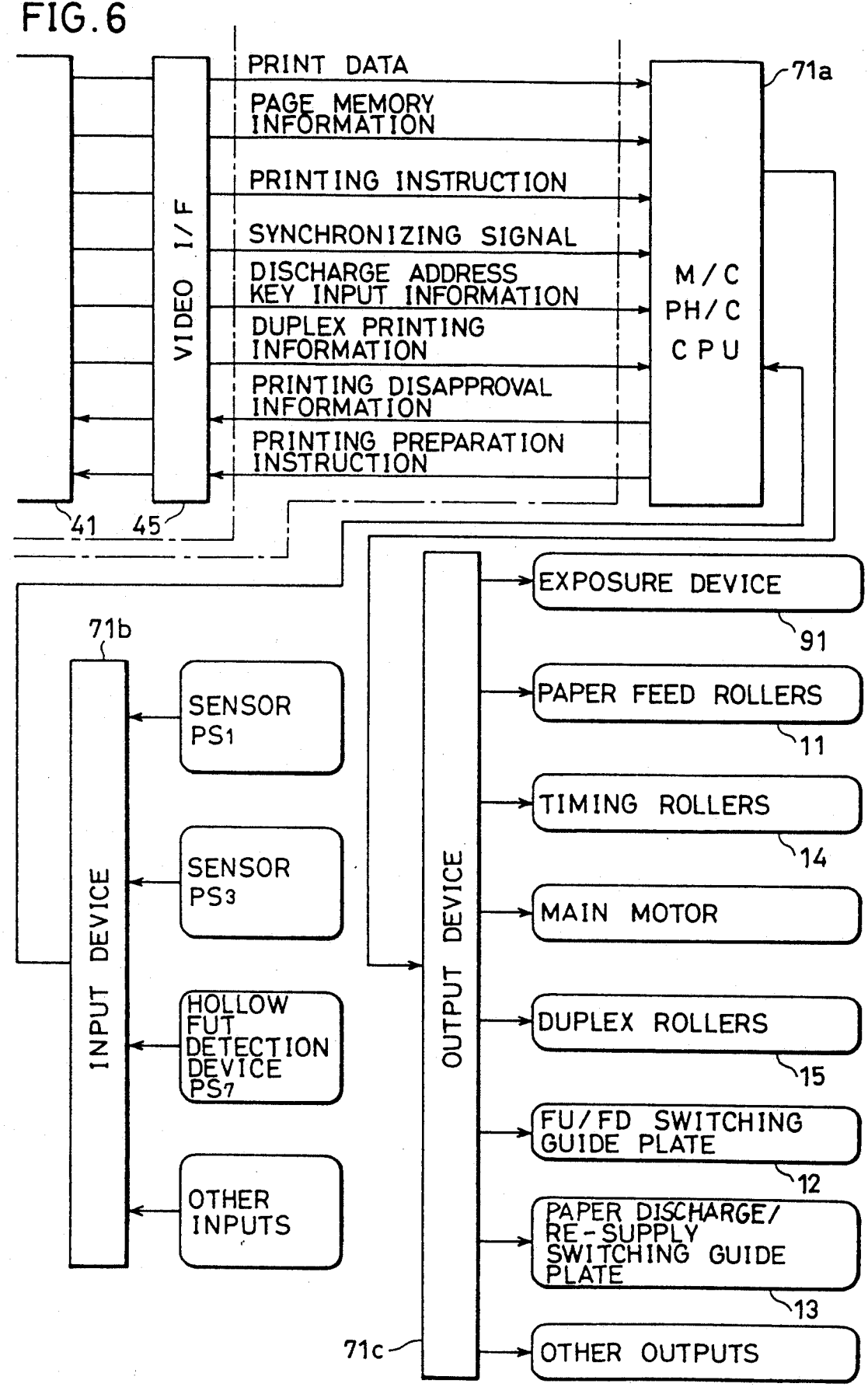
FIG. 6 is a block diagram showing the function of the engine portion of the control circuit of the printer in accordance with the first embodiment.

Now, referring to FIGS. 4-6, detailed description will be provided on each of control (function) blocks.

(2-2-a) Controller Control Portions 40

Controller control portion 40 is, as shown in FIG. 4, formed of a CPU 41 connected to host 3 through a host I/F 42, a system ROM 43 in which a control program of CPU 41 is stored, and a video I/F 45 which is an interface with engine portion 7.

Data transmitted from host 3 to controller control portion 40 through host I/F42 is first stored in the transmission buffer 61 of RAM 60. Thus, processing in CPU 41 and communication with host 3 can be executed asynchronously.

The data stored in receiving buffer 41 is sequentially read out by CPU 41 and is subjected to various processings.

For example CPU 41 conducts protocol analysis. The image data also undergoes packet processing and is stored in a packet buffer 62. Otherwise, JOB information such as the number of printing, and JOB control commands such as print command are transmitted to engine portion 7 through video I/F45.

System RAM 63 is used for an area for operations associated with storing of stack, basic flags, etc..

(2-2-b) Picture Drawing Control Portion 50

Picture drawing control portion 50 analyzes data read out from packet buffer 62 and draws the picture into a drawing picture memory. If, for example, the data is graphic data, its parameters are analyzed by a graphic image writing/reading portion 51a and the picture is drawn into picture drawing memory 64. Also, if the data is character data, an image corresponding to the character data is read from a font ROM 66 by a font image writing/reading portion 51b, and the picture of the data is drawn in picture drawing memory 64. Although in the present embodiment, bit map system is employed for the system of drawing pictures, strip-map system may be employed.

Picture drawing control portion 50 reads data in picture drawing memory 64 and transmits the same from a video data transmission portion 53 to engine portion 7 through video I/F 45.

Font RAM 65 is used for the downroad area of incoming font data transmitted from host 3.

The function of picture drawing control portion 50 is illustrated further in detail in FIG. 5.

More specifically, the data read from packet buffer 62 is written in picture drawing memory 64 by a writing portion 51a (graphic image writing portion, and font image writing portion). At that time, writing addresses in picture drawing memory 64 (page memories 1-3) are controlled by a picture drawing memory selection portion 52a.

The data of picture drawing memory 64 is read out by a reading portion 51B (graphic image reading portion, and font image reading portion), and then transmitted to video I/F45 by video data transmission portion 53. At that time, reading addresses in picture drawing memory 64 (page memories 1-3) are controlled by a read memory selection portion 52B.

The order of reading data (the order of reading from either the first line or the last line) is controlled by a reading order control portion 55.

Figure 52:
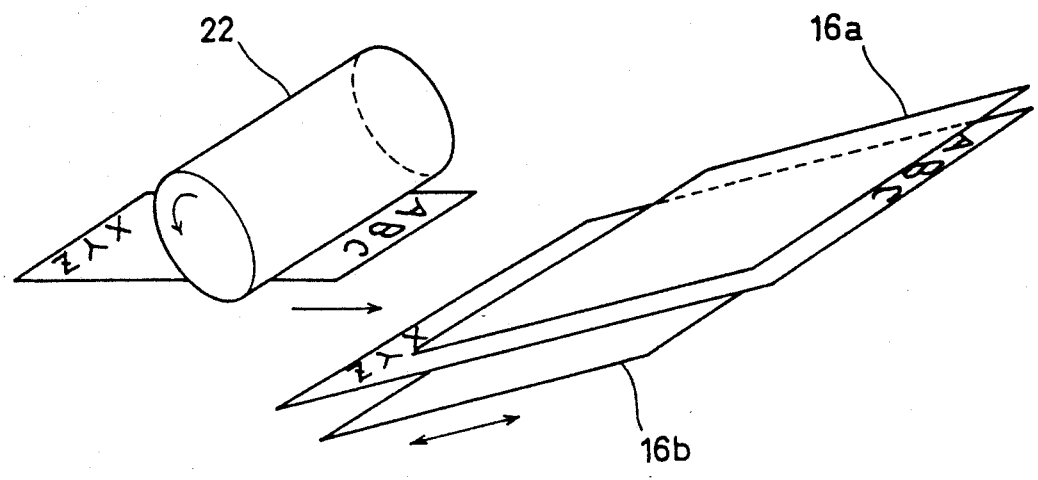
FIG. 52 is a view showing a sheet of recording paper being fed between the face up tray and a midway tray plate after printing the first plane of the sheet of recording paper in the printer in accordance with the first and second embodiments.
Figure 53:
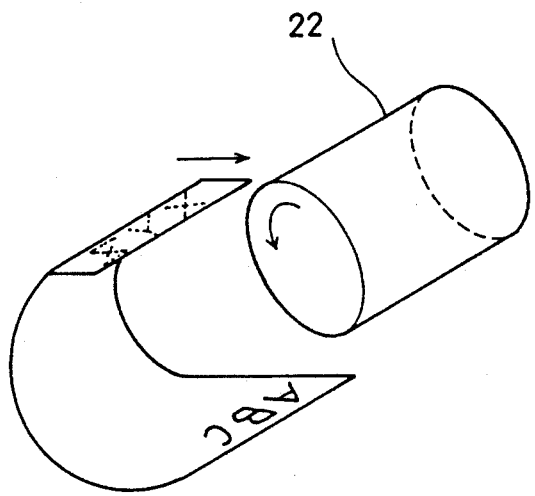
FIG. 53 is a view showing a sheet of recording paper being re-supplied in order to print the second plane of the sheet of recording paper in the printer in accordance with the first and second embodiments.
Figure 54:
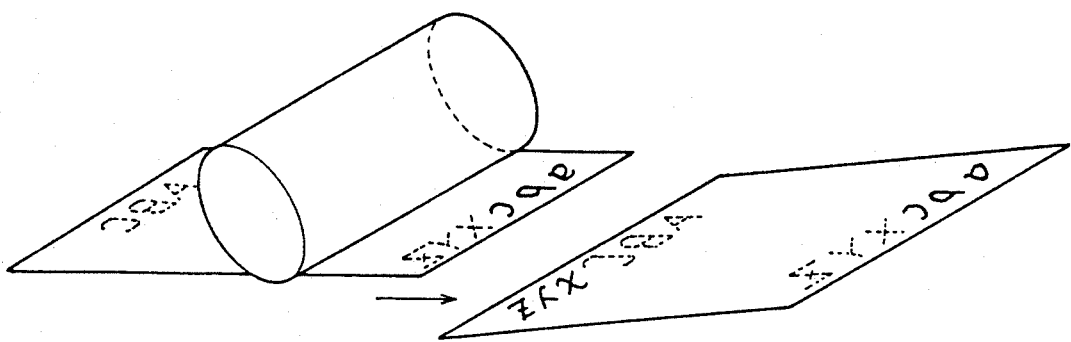
FIG. 54 is a view for illustrating how the sheet of recording paper re-supplied has its second plane printed with data read out in a usual order and discharged in the printer in accordance with the first and second embodiments.

In the present apparatus which turns a sheet recording paper upside down using a switch back mechanism, as shown in FIGS. 52, 53 and 54, the direction in which the sheet is fed at the time of the second plane recording is opposite to the direction at the time of the first plane recording. Therefore, if the order of reading data is made the same as at the time of the first plane recording, recorded characters will be completed with its top and the bottom reversed between the front and back of the sheet.

Figure 51:
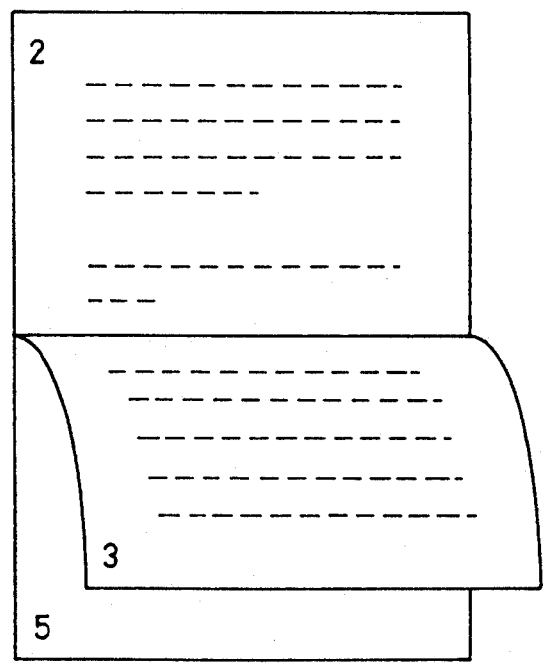
FIG. 51 is a representation showing a case in which the reading order of lines does not have to be changed for every page, when duplex printing is conducted by the printer in accordance with the first and second embodiments.

This is convenient when a booklet which opens from the top is produced by binding the lower ends of even pages and the upper ends of odd pages as shown in FIG. 51.

Figure 50:
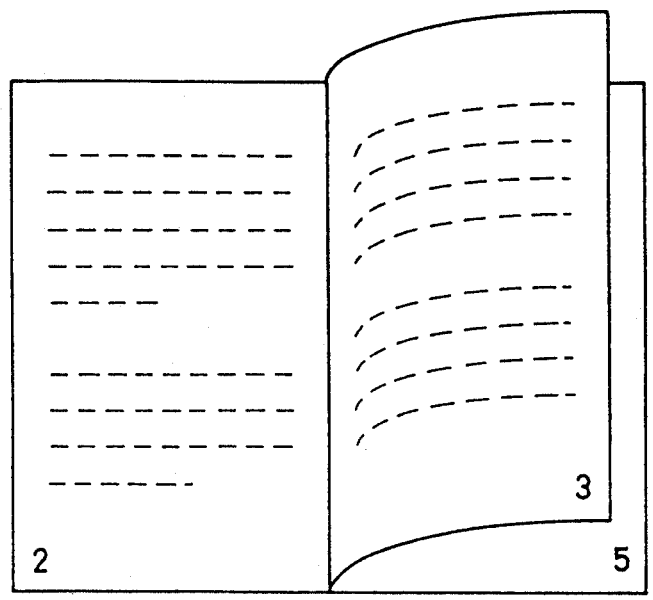
FIG. 50 is a view showing a case in which the reading order of lines should be changed for every page when duplex printing is conducted by the printer in accordance with the first and second embodiments.

If a booklet which opens from the right (when characters are written horizontally) by binding the right ends of even pages and the left ends of odd pages as shown in FIG. 50, or a booklet which opens from the left side (when characters are written in vertical columns) by binding the left ends of even pages and the right ends of odd pages is produced, however, this will not be useful because the top and bottom are reversely printed out between the front and back planes.

Figure 55:
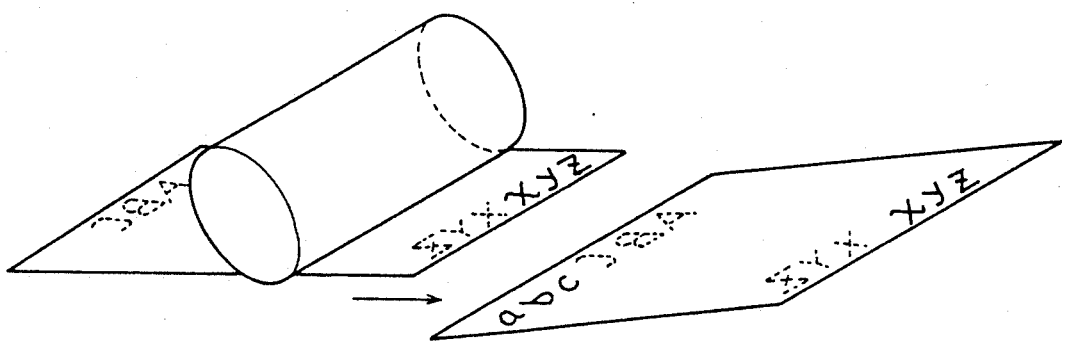
FIG. 55 is a view for illustrating the sheet of recording paper re-supplied with its second plane printed with data read out in the order upside down and discharged in the printer in accordance with the first and second embodiments.

In order to solve the above-described problem, at the time of the second plane recording, data is desirably read out in the order opposite to that at the time of the first plane recording as shown in FIG. 55. More specifically, it will be necessary to control the orders of reading data to be opposite between even pages and odd pages.

Reading control portion 55 is provided for such a control.

(2-2-c) Engine Portion 7

Two control portions forming engine portion 7, in other words engine control portion (M/C) 71A and print head control portion (PH/C) 71B are formed by a single CPU 71a in the present printer as shown in FIG. 6.

CPU 71a takes up input signals from sensors PS1–PS7 through an input device 71b, and controls the operations of exposure device 91, paper feed rollers 11, timing rollers 14, the main motor, duplex rollers 15, face up (FU)/face down (FD) switching guide plate 12, discharge/paper re-supply switching guide plate, 13 etc. through an output device 71a.

CPU 71a conducts transmission/reception of data as follows from/to video I/F45 and itself.

A printing instruction is transmitted from video I/F45 to CPU 71a.

CPU 71a in response executes prescribed printing preparation processings such as sorting sheets of recording paper from paper tray 18 by paper feed rollers 11 and feeding of the sheets to the position of timing rollers 14, and then transmits a printing preparation completion signal to video I/F45. If printing is not 10 possible for some reason, the CPU 71a transmits printing disapproval information.

Video I/F45 responds to the transmission of the printing preparation completion signal and transmits printing data to CPU 71a. Video I/F45 also transmits various kinds of information such as page memory information, a synchronizing signal, discharge address selection key input information, duplex printing information, etc.

In response to this, CPU 71a controls the operation of various components such as exposure device 91, switching guide plates 12 and 13, etc. through output device 71c. Detailed description will be later provided on printing control.

(3) Feeding/Discharging of Recording Paper in Duplex Mode

Feeding/discharging of a sheet of recording paper in the duplex mode will be described.

In the duplex mode, a sheet of recording paper is fed/discharged as follows. In FIGS. 22–45, numerals 1–10 represent printed pages, numerals in parenthesis such as (2) represent pages to be printed (in other words, yet to be printed). In FIGS. 46–49, numerals in squares represent printed pages, and its order indicates that the pages are printed out from the left to the right. t1–t9 representing the intervals between the squares each indicate a time period required from completion of printing of each page until initiation of printing of the next page.

(3-1) Feeding of Memory Capacity.1 Page on FUT 16a

When picture drawing memory 64 has a memory capacity of 1 page and face up tray (FUT) 16a is selected as the discharge address, feed/discharge with low through put is conducted as shown in FIGS. 22-24 and FIG. 46.

Figure 22:
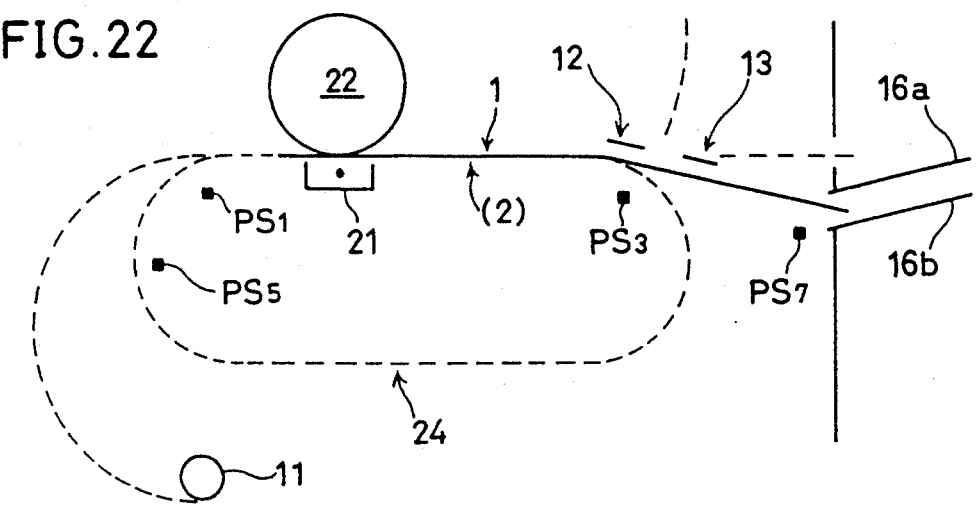
FIGS. 22 to 24 are representations showing a method of feeding a sheet of recording paper to be discharged onto a face up tray when duplex printing is conducted with a memory capacity of 1 page by the printer in accordance with the first and second embodiments.

After the first sheet of recording paper is fed from paper tray 18 and data for the first page is printed on its first plane, the sheet is fed to the side of duplex rollers 15 with guide plate 12 and guide plate 13 being set to the upper position and the lower position, respectively, and the first sheet of recording paper is stopped in the hollow portion formed of face up tray (FUT) 16a and midway tray plate 16b by duplex rollers 15 (FIG. 22).

Figure 23:
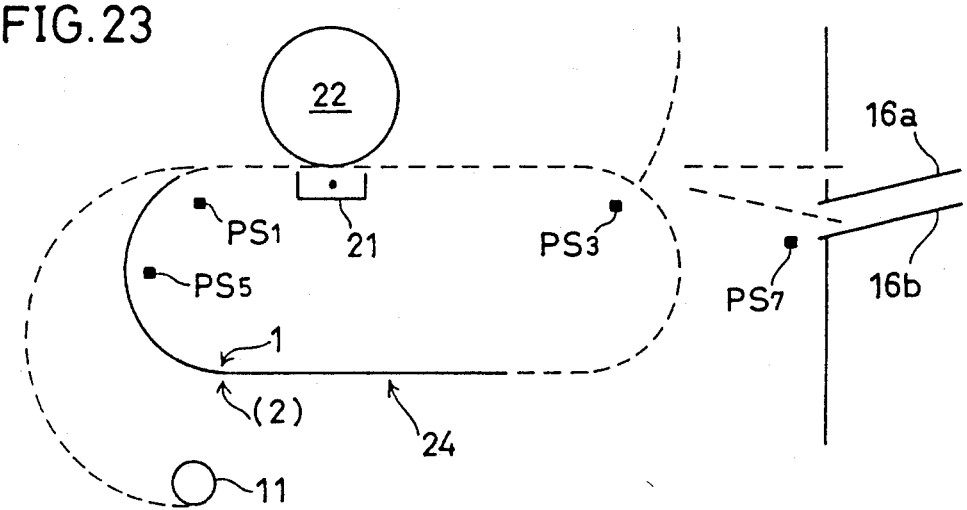

Then, duplex rollers 15 are reversely rotated to feed the first sheet of recording paper into the re-paper supply path 24, and then the sheet of recording paper is supplied by the guide rollers, etc. to the position preceding to timing rollers 14 (the position of sensor PS1) (FIG. 23). Thus, printing onto the second plane of the first sheet of recording paper is enabled.

Figure 24:
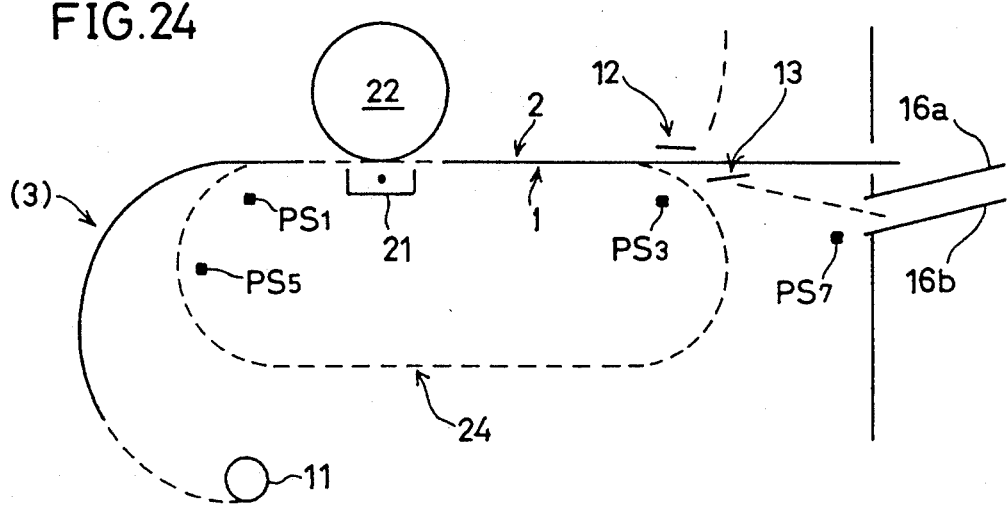

After data for the second page is printed on the second plane of the first sheet of recording paper, the first sheet of recording paper is discharged onto face up tray (FUT) 16a with guide plate 12 and guide plate 13 being set to the upper position and the lower position, respectively, and the second sheet of recording paper is fed from paper tray 18, enabling printing of data for the third page on its first plane (FIG. 24).

Subsequently, feeding/discharging processing is conducted in a similar manner.

More specifically, in the case of (3-1), printing processing is sequentially conducted on each plane of a sheet of recording paper fed from paper tray 18, the next recording paper is fed from paper tray 18 after printing onto the both planes of the recording paper is completed, and printing processing is sequentially conducted onto the both sides of the next paper.

Therefore, as shown in FIG. 46, a time interval t1 between printing to the first plane of each sheet of recording paper and printing to the second plane (time period between the first page and second page, the third page and fourth page and so on) is prolonged for time required for passing a sheet of paper in the paper re-supply path 24, decreasing the total throughput as a result.

(3-2) Memory Capacity.2 Pages, Feeding of Paper to FUT 16a

When picture drawing memory 64 has a memory capacity of 2 pages, and face up tray (FUT) 16a is selected as the discharge address, feeding/discharging with a high throughput is permitted as shown in FIGS. 25-33 and FIG. 47.

Figure 25:
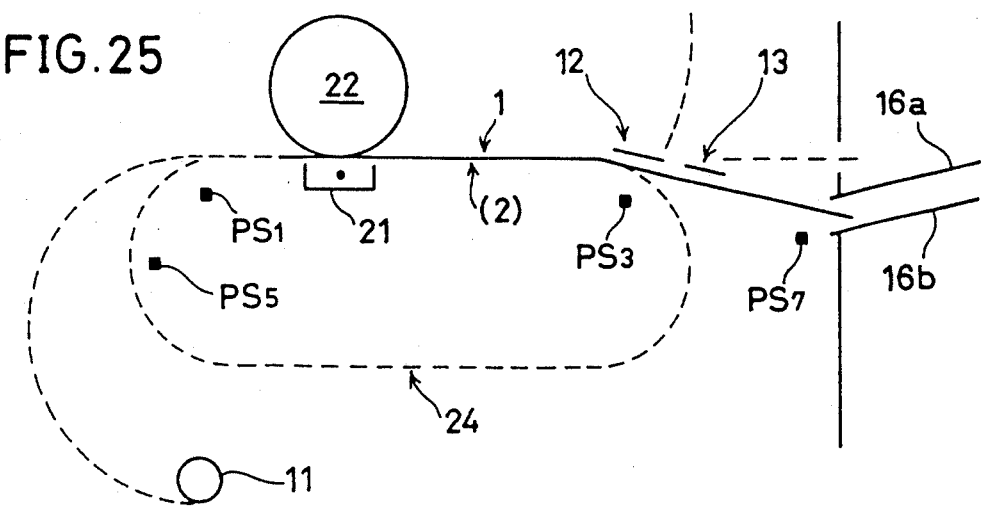
FIGS. 25 to 33 are representations showing a method of feeding a sheet of recording paper to be discharged onto the face down tray when duplex printing is conducted with a memory capacity of 2 pages by the printer in accordance with the first and second embodiments.

The first sheet of recording paper is fed from paper tray 18, data for the first page is printed on its first plane, then the first sheet of recording paper is sent to the side of duplex rollers 15 by setting guide plates 12 and 13 and once stopped in the hollow portion between FUT 16a and midway tray plate 16b by duplex rollers 15 (FIG. 25).

Figure 26:
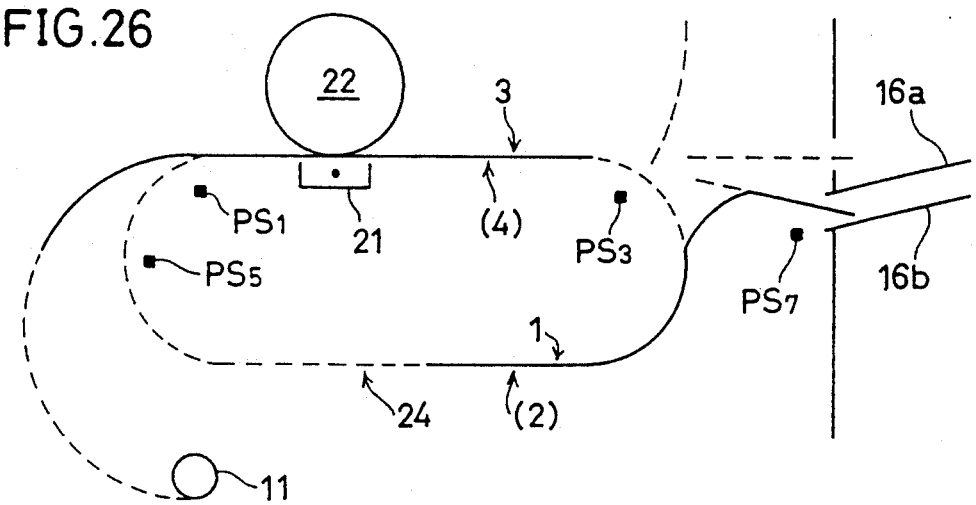

Then, duplex rollers 15 are reversely rotated to feed the first sheet of recording paper into the paper re-supply path 24, the second sheet of recording paper is fed from paper tray 18 and data for the third page is printed on its first plane (FIG. 26). The second sheet of recording paper is sent into the hollow portion by duplex rollers 15 after the printing.

Then, the first sheet of recording paper is fed to the transfer position (between photoreceptor drum 22 and transfer charger) by the guide rollers, etc. in the paper re-supply path 24, data for the second page is printed onto its second plane and the second sheet of recording paper in the hollow portion is fed into the paper resupply path 24 by reversely rotating duplex rollers 15.

Figure 27:
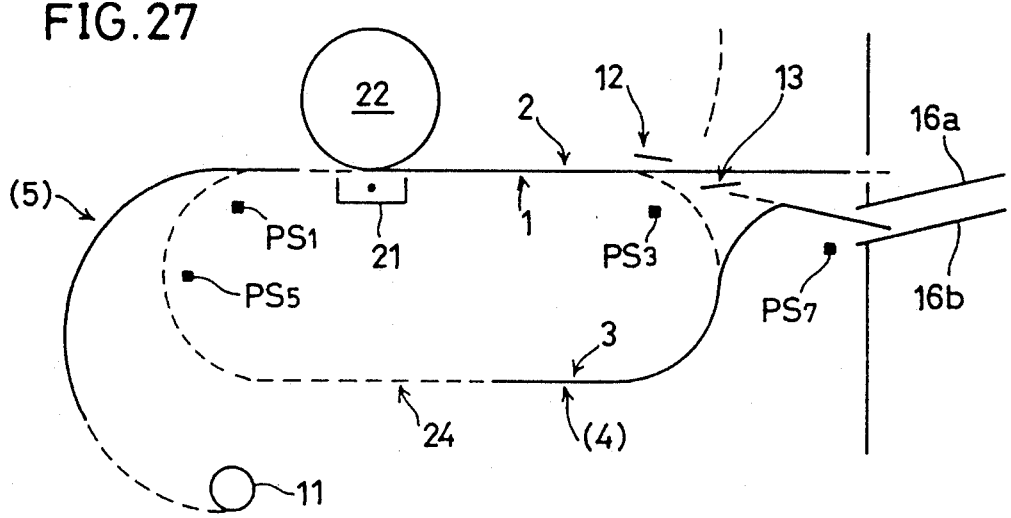

After the printing of the second page onto the second plane of the first sheet of recording paper, the first sheet of recording paper is discharged onto face up tray (FUT) 16a by setting guide plates 12 and 13, the third sheet of recording paper is fed from paper tray 18 and data for the fifth page is printed on its first plane (FIG. 27).

Figure 28:
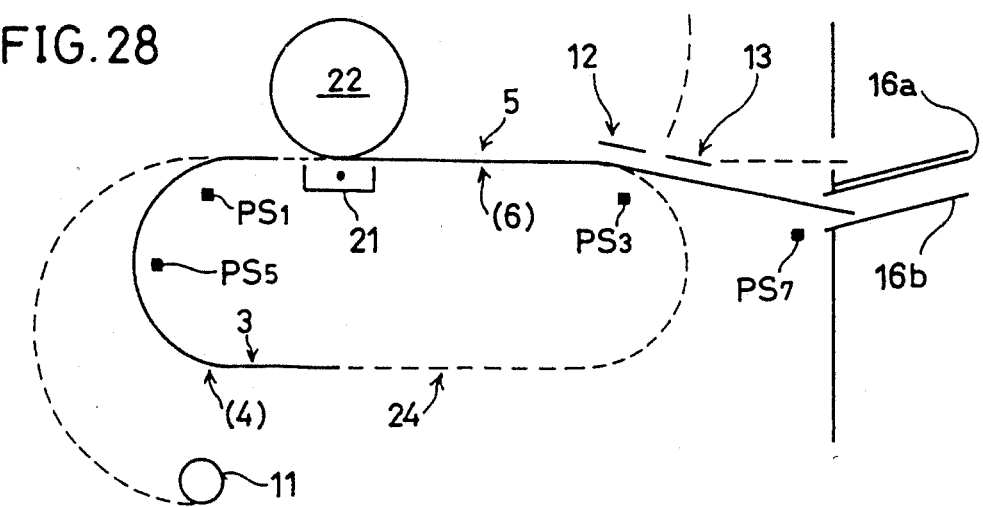
Figure 29:
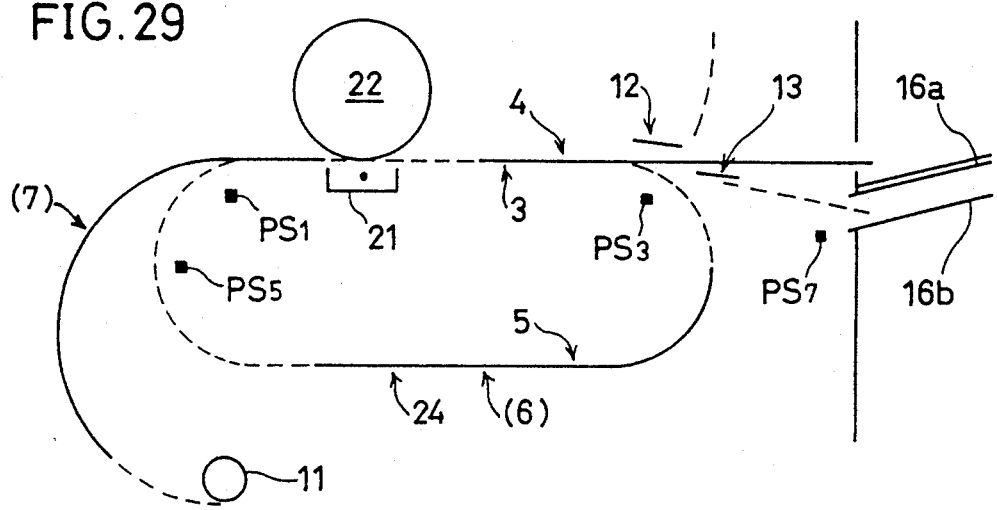
Figure 30:
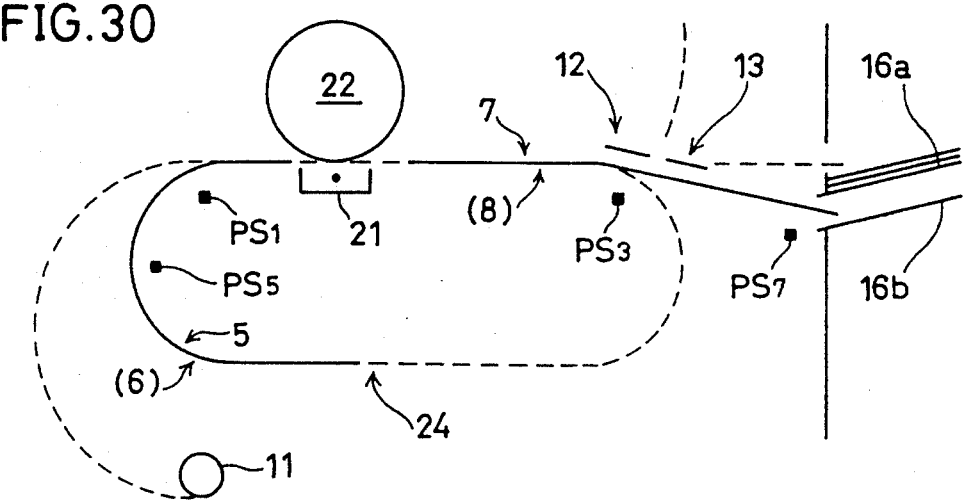
Figure 31:
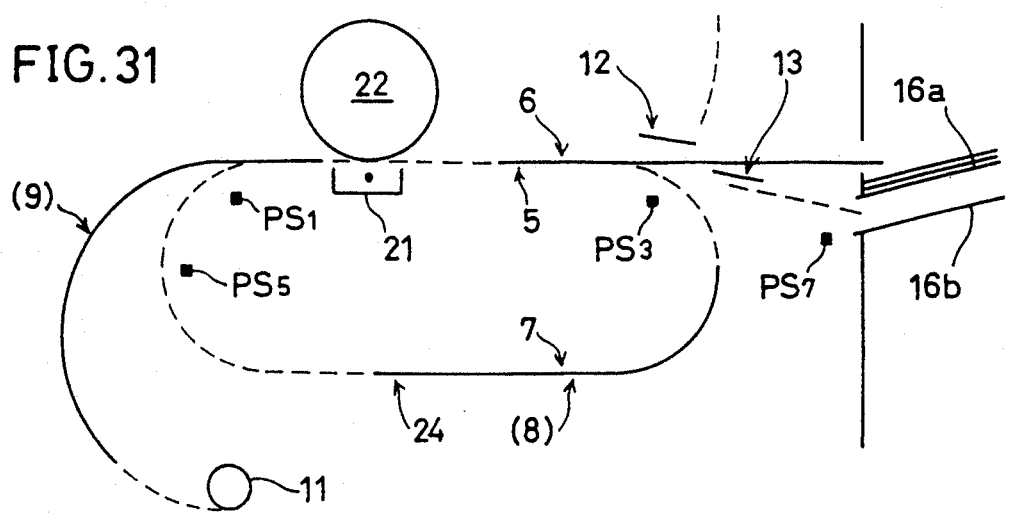
Figure 32:
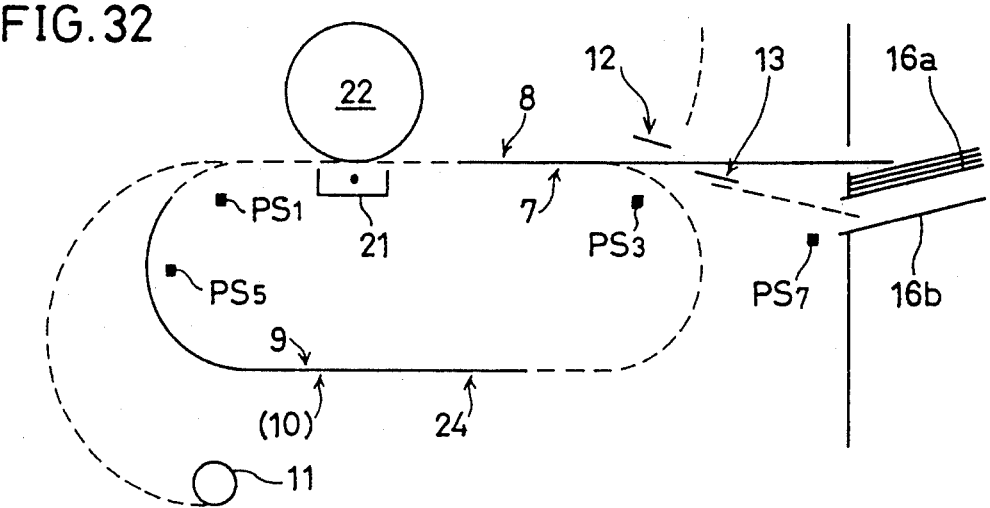

Then, the third sheet of recording paper after the printing of the data for the fifth page is sent into the hollow portion, the second sheet of recording paper in the paper re-supply path 24 is transferred to the transfer position, and data for the fourth page is printed on its second plane (FIG. 28).

Feeding/discharging control similar to FIGS. 27-28 is each conducted in FIGS. 29 and 30, and FIGS. 31 and 32. Thus, printing of the fourth page, the seventh page, the sixth page, the ninth page, and the eight page is conducted.

Figure 33:
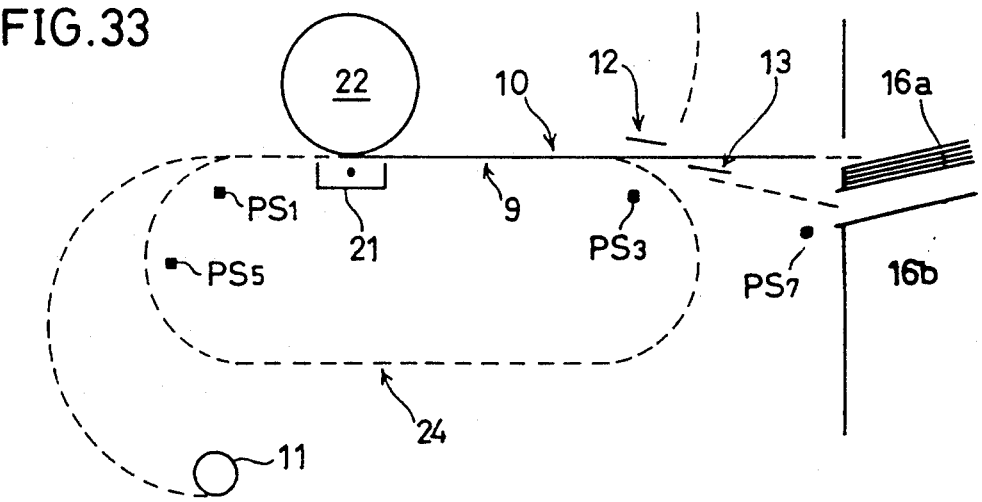

Examples shown in FIGS. 25-33 and FIG. 47 are the cases in which data for 10 pages is printed onto 5 sheets of recording paper, and feeding of the sixth sheet of recording paper is not conducted after printing the eighth page which is the second plane of the fourth sheet of recording paper, the fifth sheet of recording paper in the paper-resupply path 24 is fed, and data for the tenth page is printed on its second plane (FIG. 33).

As described above, in the case of (3-2), maximum three sheets of recording paper can be placed in the state of feeding (or in the state of waiting) in various places in the paper passing path, and printing time intervals between pages can be shortened as represented by t4 in FIG. 47 taking advantage of that data for two pages can be stored. This can increase the total throughput.

A printing time interval t3 between the first page and the third page is slightly prolonged because the second sheet of recording paper cannot be supplied into the hollow portion between FUT 16a and midway tray plate 16b until the feeding of the first sheet of recording paper into the paper re-supply path 24 is completed. Also, a printing time interval t5 between the final page and the (final á1) áth page is prolonged because the printing operation must be in the state of waiting until the final sheet of recording paper is transferred to the transfer position via the paper re-supply path 24.

(3-3) Memory Capacity 2 Pages, Discharging of Paper to FDT 17

When picture drawing memory 64 has a memory capacity of 2 pages, and face down tray (FDT) 17 is selected as the discharge address, feeding/discharging with a low throughput is conducted as shown in FIGS. 34-36, and FIG. 48.

Figure 34:
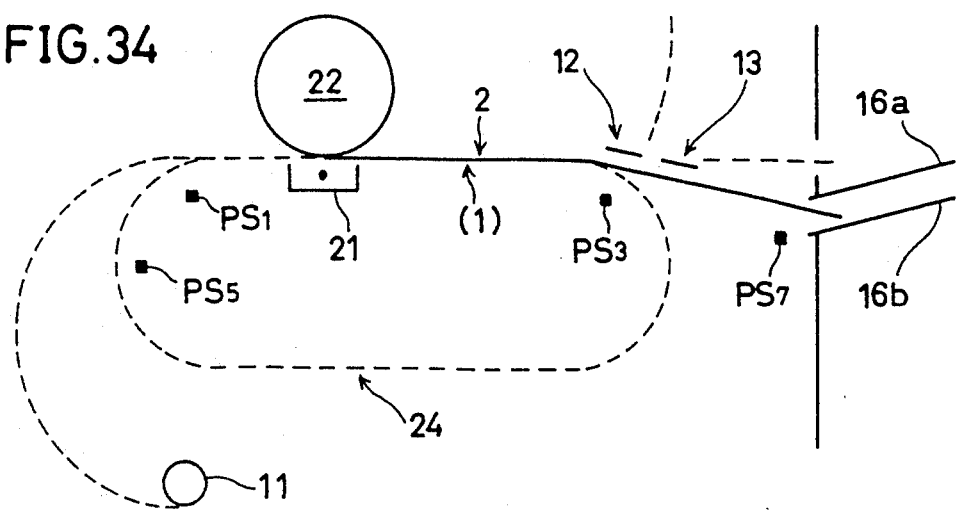
FIGS. 34 to 36 are representations showing a method of feeding a sheet of recording paper to be discharged onto a face down tray when duplex printing is conducted with a memory capacity of 2 pages by the printer in accordance with the first and second embodiments.

After the first sheet of recording paper is fed from paper tray 18, and data for the second page is printed on the first plane, the first sheet of recording paper is sent to the side of duplex rollers 15 by setting guide plates 12 and 13, and is once stopped in the hollow portion between FUT 16a and midway tray 16b by duplex rollers 15 (FIG. 34).

Figure 35:
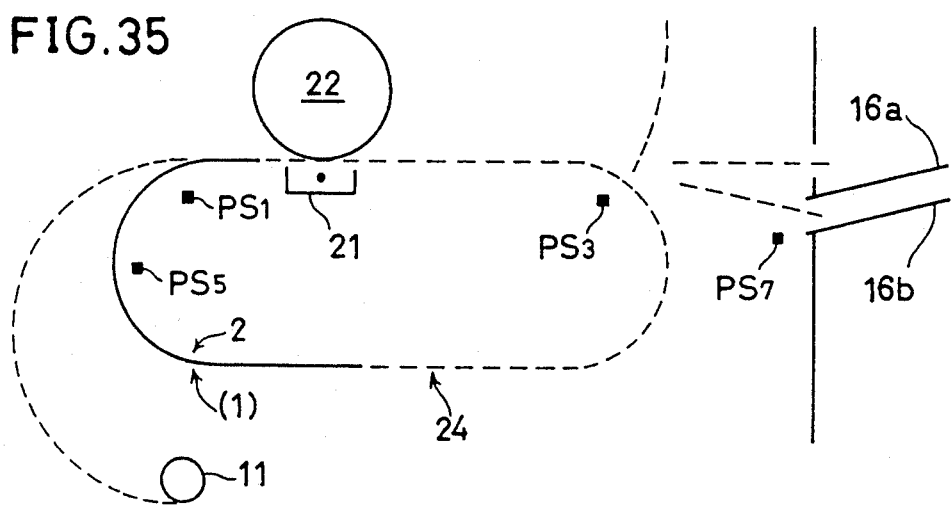

Then, the first sheet of recording paper is fed into paper re-supply path 24 by reversely rotating duplex rollers 15, and is then transferred to the position preceding to timing rollers 14 (the position of sensor PS1) by the guide rollers, etc. (FIG. 35). Thus, printing of the data for the first page onto the second plane of the first sheet of recording paper is enabled.

Figure 36:
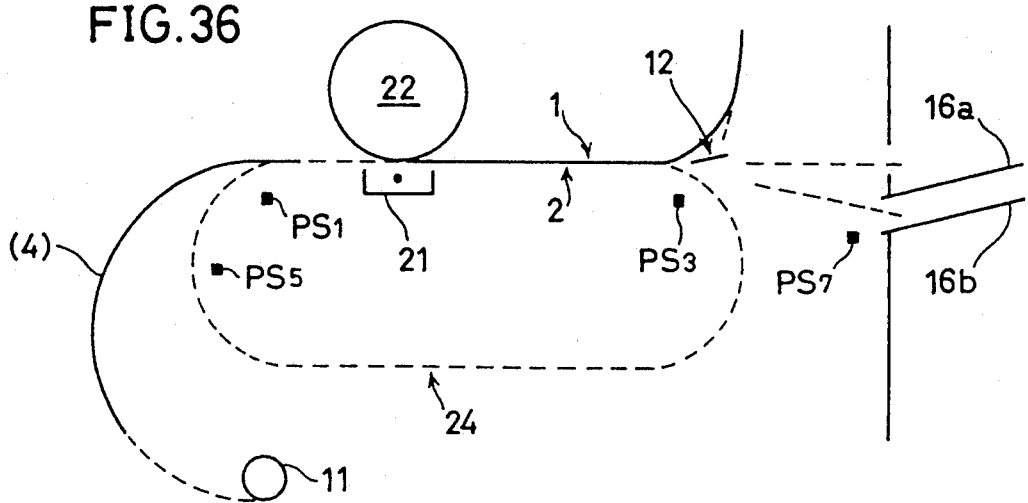

Then, the data for the first page is printed on the second plane of the first sheet of recording paper, and the first sheet of recording paper is discharged onto face down tray (FDT) 17 with guide plate 12 being set at the lower position. The second sheet of recording paper is fed from paper tray 18, and data for the fourth page is printed on its first plane (FIG. 36).

Feeding/discharging processing is similarly conducted in the following.

More specifically, in the case of (3-3), printing processing is sequentially conducted onto each plane of a sheet of recording paper fed from paper tray 18 with the order of pages reversed, and after the printing onto the both planes of the sheet of recording paper is completed, the next sheet of recording paper is fed from paper tray 18, and printing processing is sequentially conducted on each opposing planes with the order of pages reversed.

Figure 48:
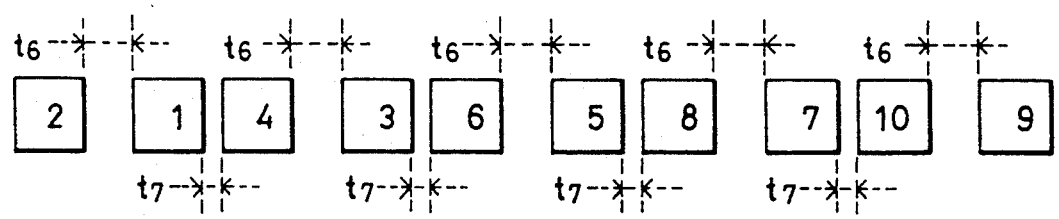
FIG. 48 is a representation showing the order of reading page data and time intervals for printing when the sheet of recording papers are discharged onto the face down tray, when duplex printing is conducted with a memory capacity of 2 pages by the printer in accordance with the first and second embodiments.

Therefore, as shown in FIG. 48, a time interval t6 between printing onto the first plane of each sheet of recording paper and printing onto its second plane (time periods between the second page and the first page, the fourth page and third page) is prolonged for time required for passing the paper in the paper re-supply path 24, decreasing the total throughput.

Memory Capacity. 3 Pages, Feeding of Paper to FDT 17

When picture drawing memory 64 has a memory capacity of 3 pages, and face down tray (FDT) 17 is selected as the discharge address, feeding/discharging with a high throughput is enabled as shown in FIGS. 37-45, and FIG. 49.

Figure 37:
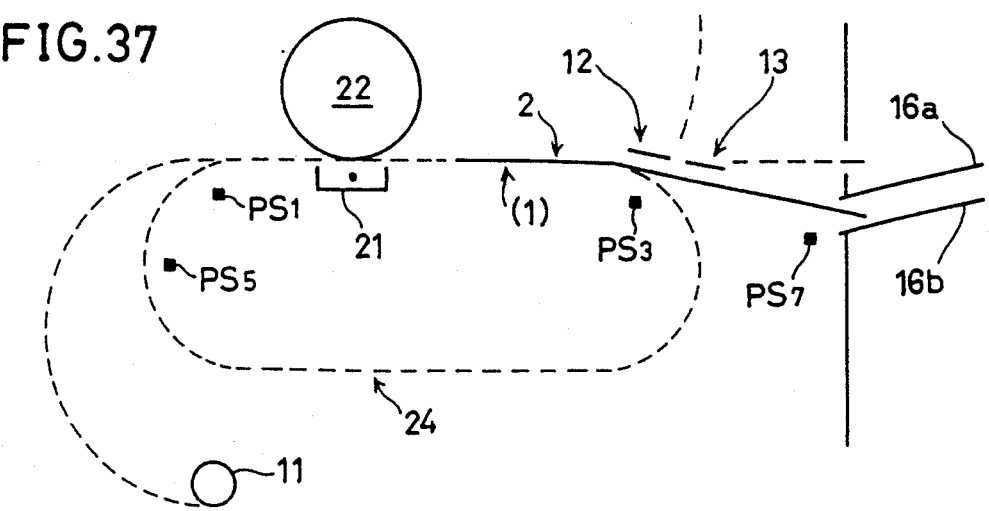
FIGS. 37 to 45 are representations showing a method of feeding a sheet of recording paper to be discharged onto the face down tray when duplex printing is conducted with a memory capacity of 3 pages by the printer in accordance with the first and second embodiments.

After the first sheet of recording paper is fed from paper tray 18 and data for the second page is printed on its first plane, the first sheet of recording paper is sent to the side of duplex rollers 15 by setting guide plates 12 and 13, and is once stopped in the hollow portion between FUT 16a and midway tray plate 16b by duplex rollers 15 (FIG. 37).

Figure 38:
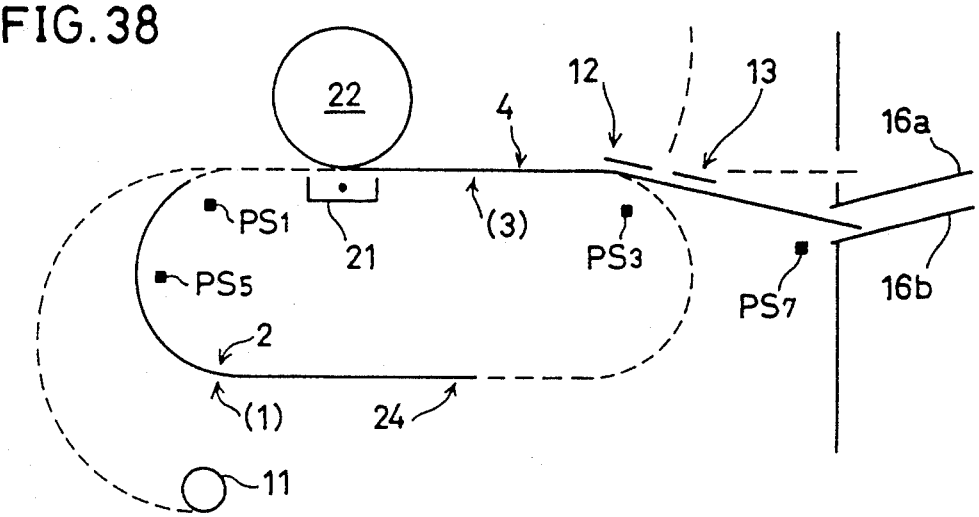

Then, the first sheet of recording paper is fed into the paper re-supply path 24 by reversely rotating duplex rollers 15, the second sheet of recording paper is fed from paper tray 18 and data for the fourth page is printed on its first plane (FIG. 38). The second sheet of recording paper is sent into the hollow portion by duplex roller 15 after the printing.

The first sheet of recording paper is transferred to the transfer position (between photoreceptor drum 22 and transfer charger) by the guide rollers, etc. in the paper re-supply path 24, and data for the first page is printed onto its second plane as well as the second sheet of recording paper in the hollow portion is sent into the paper re-supply path 24 by reversely rotating duplex rollers 15.

After the first page is printed onto the second plane of the first sheet of recording paper, the first sheet of recording paper is discharged onto face down tray (FDT)

Figure 39:
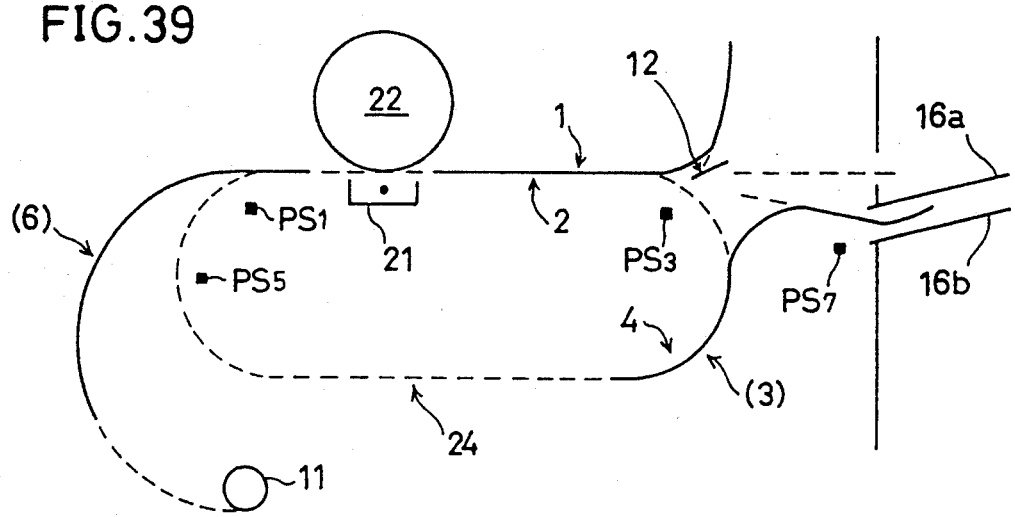

17 by setting guide plates 12 at the lower position, the third sheet of recording paper is fed from paper tray 18, and data for the sixth page is printed onto its first plane (FIG. 39).

Figure 40:
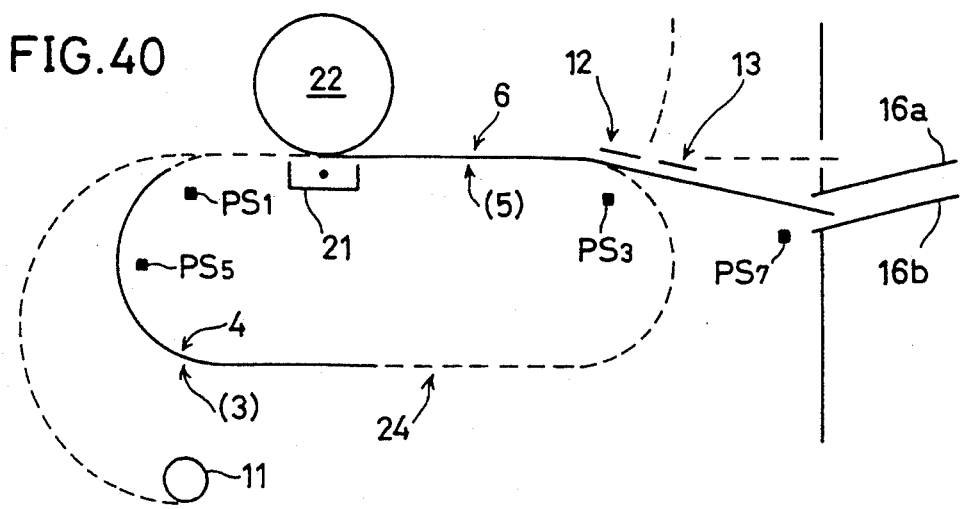
Figure 41:
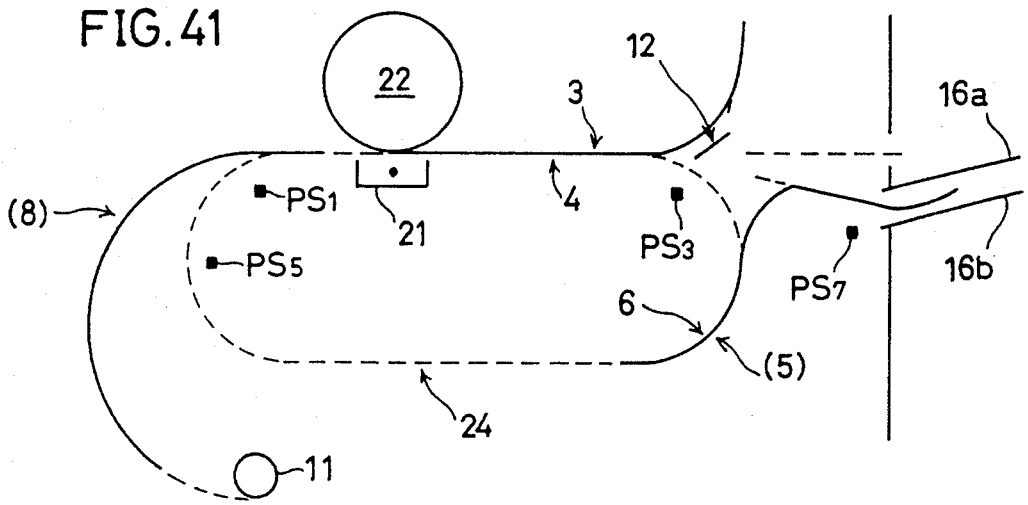
Figure 42:
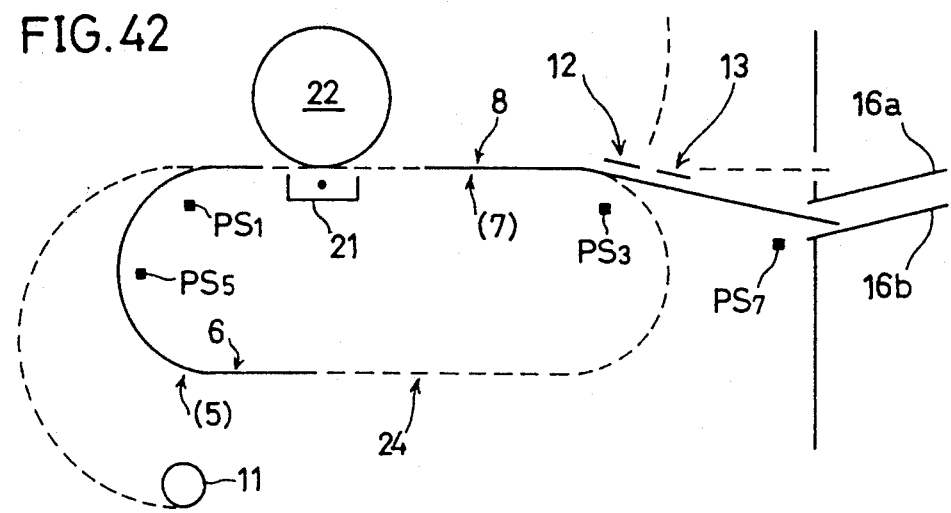
Figure 43:
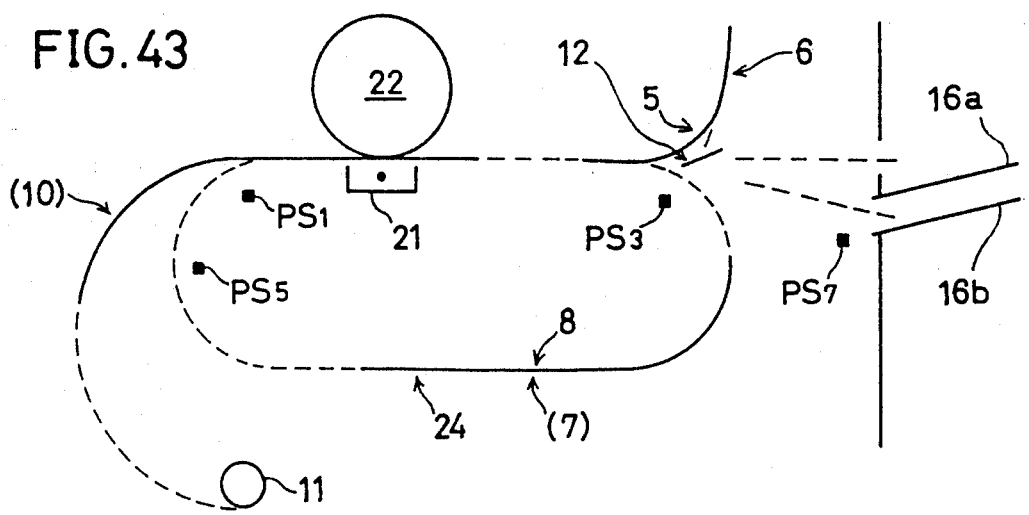
Figure 44:
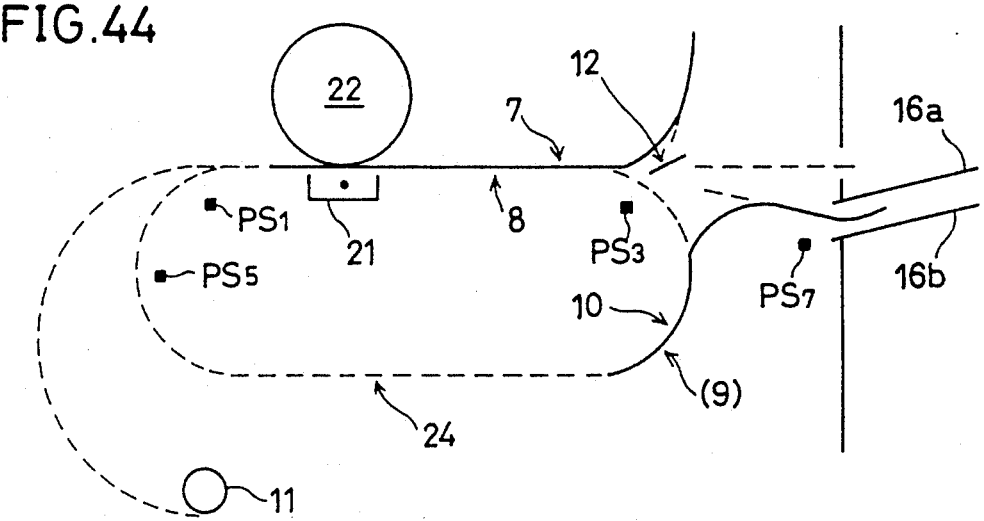

The third sheet of recording paper after the data for the sixth page is printed thereon sent into the hollow portion as well as the second sheet of recording paper in the paper re-supply path 24 is transferred to the transfer position, and data for the third page is printed on its second plane (FIG. 40).

Subsequently, feeding/discharging control similar to the above-described FIGS. 39 and 40 is each conducted in FIGS. 41 and 42, and FIGS. 43 and 44. Thus printing of the third page, the eighth page, the fifth page, the tenth page and the seventh page is conducted.

Figure 45:
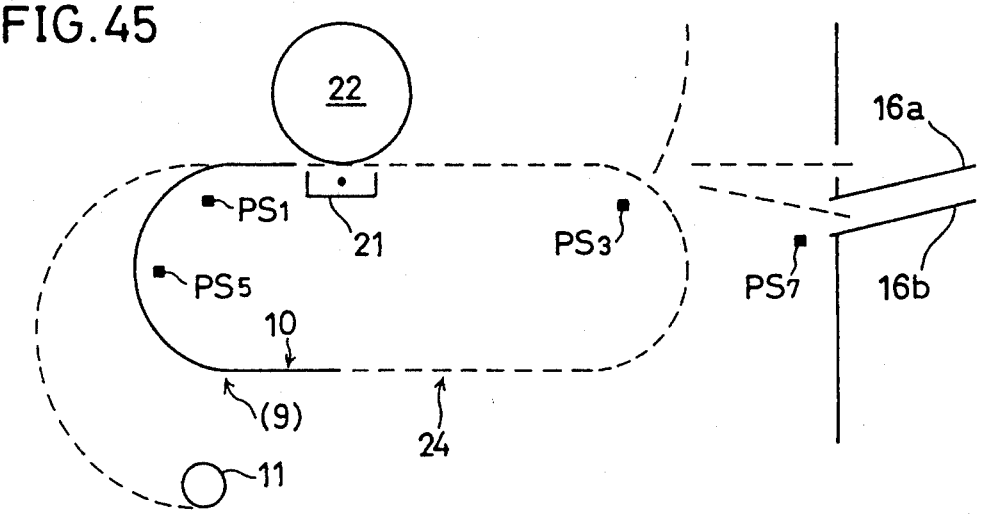

Examples shown in FIGS. 37–45, and FIG. 49 are the cases in which data for 10 pages are printed onto 5 sheets of recording paper, feeding of the sixth sheet of recording paper is not conducted after the seventh page which is the second plane of the fourth sheet of recording paper is printed, and the fifth sheet of recording paper in the paper re-supply path 24 is fed, with data for the ninth page being printed on its second plane (FIG. 45).

Figure 49:
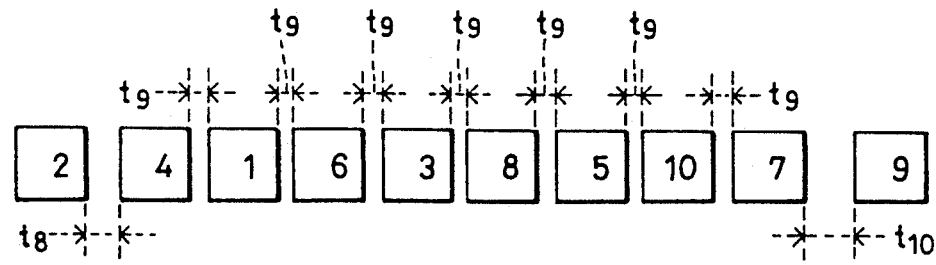
FIG. 49 is a representation showing the order of reading page data and time intervals for printing when the sheet of recording papers are discharged onto the face down tray, when duplex printing is conducted with a memory capacity of 3 pages by the printer in accordance with the first and second embodiments.

As described above, in the case of (3-4), printing time intervals between pages represented by t9 in FIG. 49 can be shortened taking advantage of the fact that maximum three sheets of recording paper can be placed in the state of feeding (or the state of waiting) and data for three pages can be stored. Therefore, the total throughput can be increased.

The printing time interval t8 between the second page which is the first plane of the first sheet of recording paper and the fourth page which is the first plane of the second sheet of recording paper is slightly prolonged, because the second sheet of recording paper cannot be supplied into the hollow portion between FUT 16a and midway tray plate 16b until feeding of the first sheet of recording paper into the paper re-supply path 24 is completed.

Also, the printing time interval t10 between the (final −1)-th page which is the second plane of the final sheet of recording paper and the (final −3)-th page which is the second plane of the (final −1)-th sheet of recording paper is prolonged, because the printing operation should be in the state of waiting until the final sheet of recording paper is transferred to the transfer position via the paper re-supply path 24.

(4) Control of Printer Engine

Description will be provided on printing control of a printer in accordance with the first embodiment for illustrating processing in CPU 71a for controlling engine portion 7 (see FIG. 6).

Figure 7:
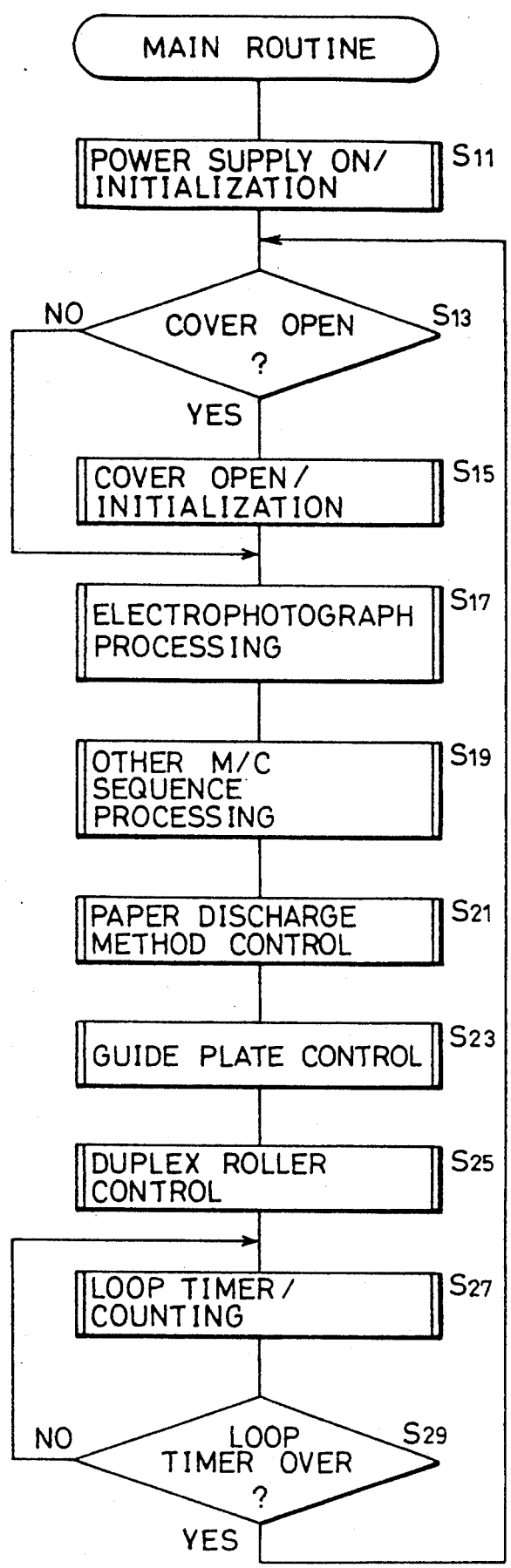
FIG. 7 is a flow chart showing the main routine of processing in a CPU in the engine portion of the printer in accordance with the first and second embodiments.

FIG. 7 is a flow chart showing the main routine of processing in CPU 71a in engine portion 7.

(4-1) Main Routine

CPU 71a starts processing, for example, by turning on of a main switch, and conducts initialization processing when the power supply is on in step S11.

Then, CPU 71a determines whether or not the cover of the printer is opened and if it is open (S13;YES), CPU 71a conducts initialization processing when the cover is opened (S15). The cover is usually opened by a user, etc. when the jam of sheets of recording paper takes place or when an expendable material such as toner is exchanged. The user is exposed to danger if heat rollers 23 are excessively heated, or laser light is being emitted. This processing is executed in order to avoid such danger. Prescribed data is stored in a prescribed area so that printing operation can immediately resumed as before.

When the cover is not opened (S13;NO) on the other hand, the processing in step S15 is omitted.

In step S17, electrophotography processing is conducted. This processing is necessary for executing various processing such as uniform charging of photoreceptor drum 22, forming of an electrostatic latent image onto photoreceptor drum 22 by the control of laser exposure device 91, the toner phenomenon of the electrostatic latent image, transfer of the toner image onto a sheet of recording paper, and fixing of the image by heat rollers 23. This processing is well known, and therefore, detailed description will not be provided thereon.

In step S19, processings necessary for controlling printing operation and other than the processings executed in the above step S17 and the following steps S21–S25 are conducted. This processing is also known, and, therefore, detailed description will not be provided thereon.

In step S21, control of a method of discharging paper is conducted. This processing is conducted for determining whether or not a sheet of paper can be discharged onto a designated tray in the duplex mode, or when it is possible whether the throughput of printing is high or low depending upon the capacity of picture drawing memory 64, and for indicating the result. Detailed description will be later provided in conjunction with FIGS. 8–10.

In step S23, switching control of guide plates 12 and 13 is conducted. This processing is for moving up and down guide plates 12 and 13 depending upon a set mode and the stage of recording paper feeding processing executed. Detailed description will later be provided in conjunction with FIGS. 11 and 12.

In step S25, control of duplex rollers is conducted. This processing is for controlling normal rotation/stop/reverse rotation of duplex rollers 15 depending upon a set mode and the stage of recording paper feeding processing executed. Detailed description will be provided in conjunction with FIGS. 13 and 14 later.

In step S27, a routine timer for keeping constant time for executing 1 routine is counted, and when time is up (S29;YES), the control returns to step S13 to repeat the above-described processings.

(4-2) Paper Discharging Method Control (FIGS. 1–10)

Figure 8:
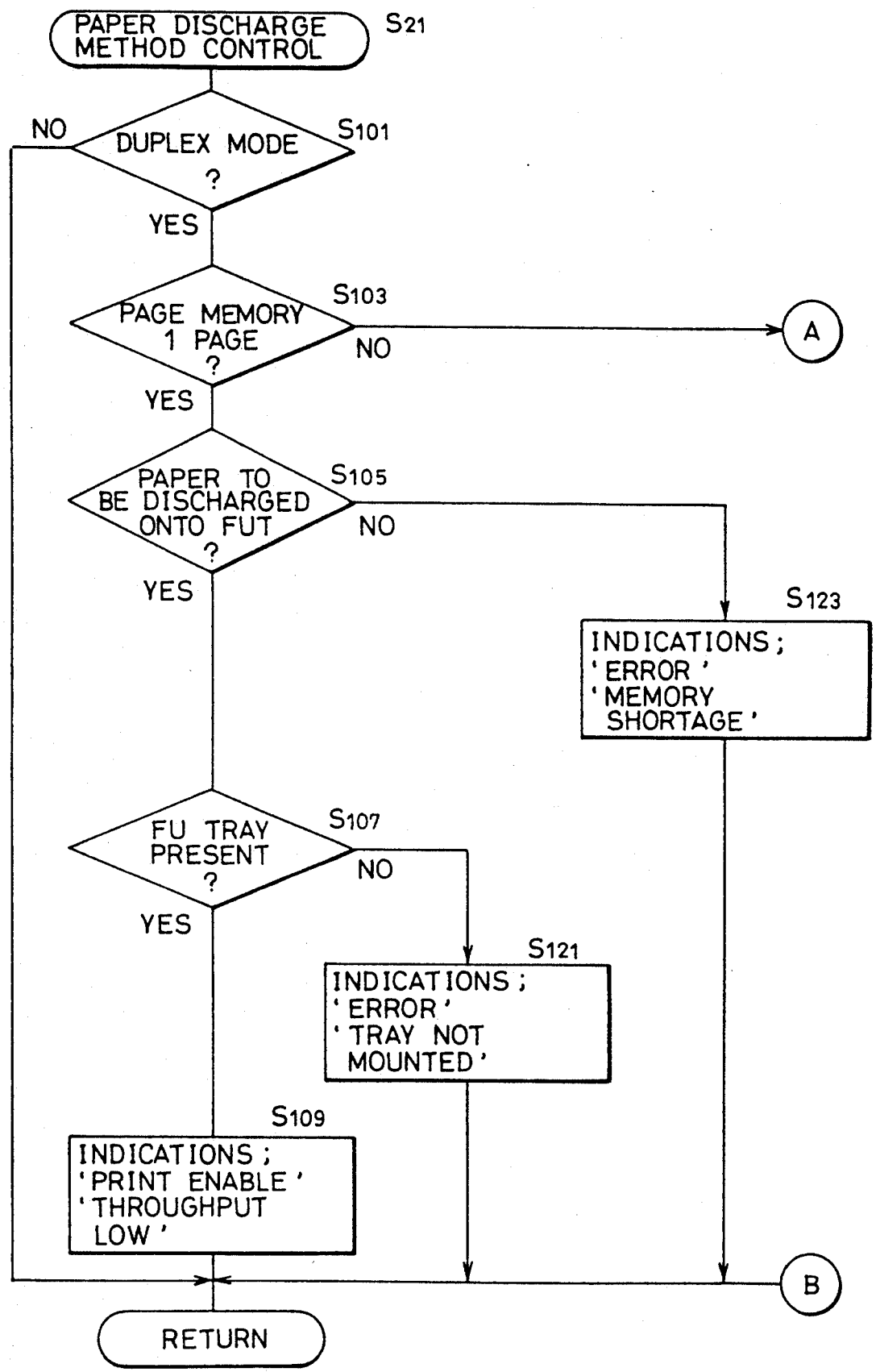
FIGS. 8-10 are flow charts each partially showing control processing in a paper feeding method executed in the CPU in the engine portion of the printer in accordance with the first embodiment.
Figure 9:
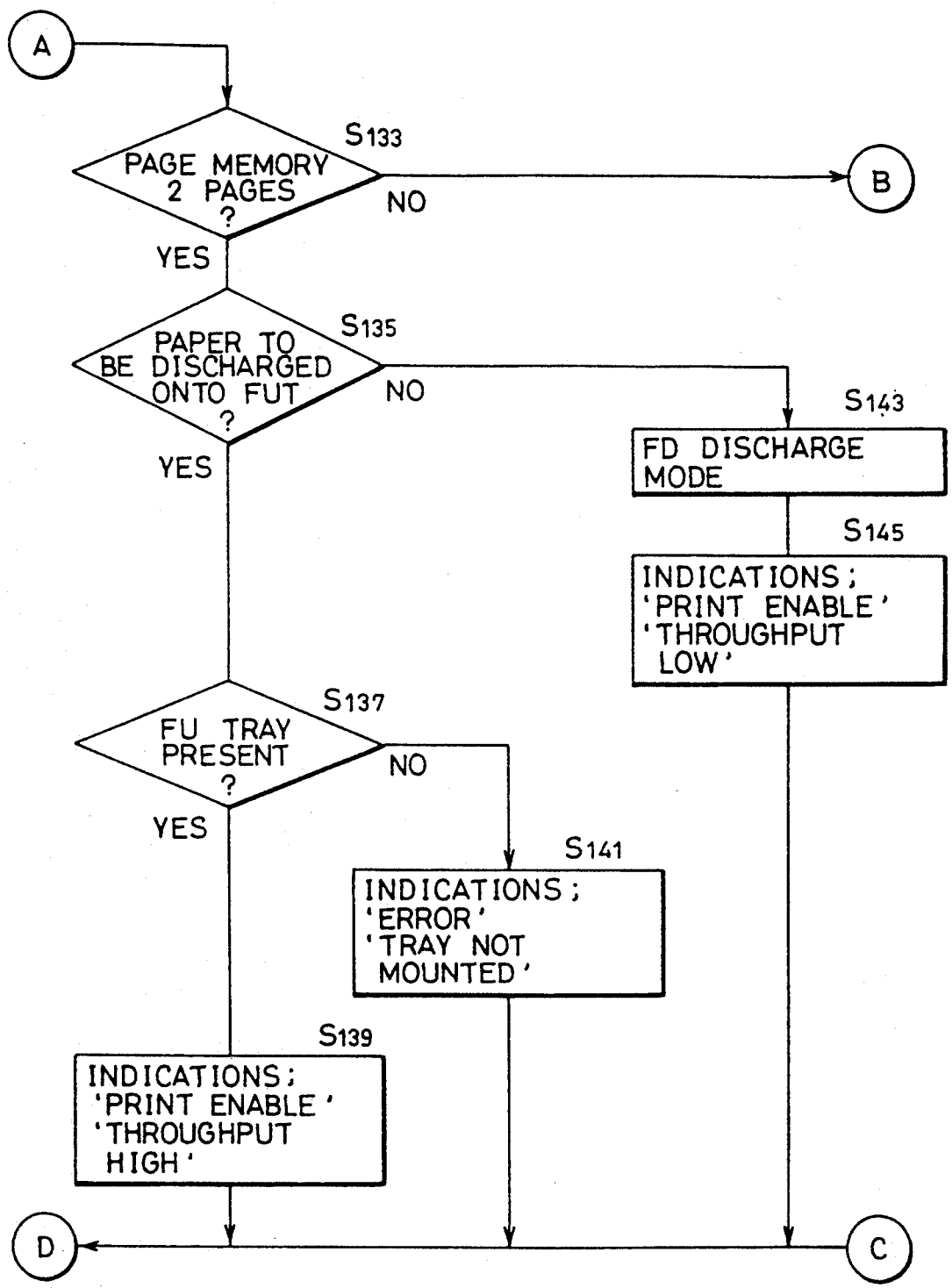
Figure 10:
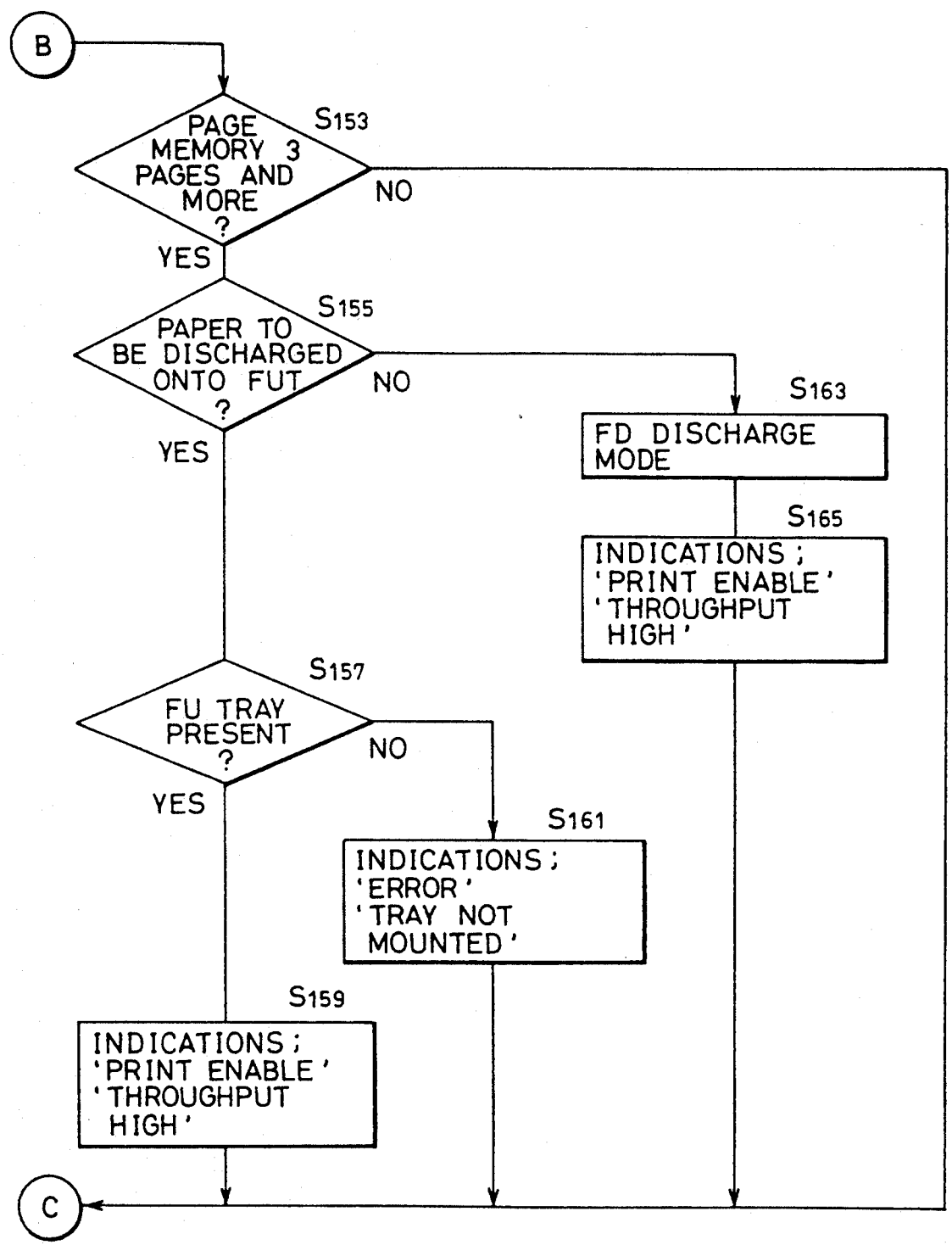

The control of paper discharging method (S21) will be described in conjunction with FIGS. 8–10.

The paper discharging method control is executed when the duplex mode is set (S101;YES). In other words, when the duplex mode is not set (S101;NO), the processing is not substantially executed, and the control immediately returns to the main routine.

It is determined whether or not the memory capacity of drawing picture memory 64 is a capacity for 1 page (S103). The memory capacity for 1 page is, for example, a capacity of about 1M byte in the case of A4 size.300 DPI.

In step S103, if the memory capacity is 1 page (S103;YES), it is determined whether or not the mode in which paper is discharged onto face up tray (FUT) 16a is selected (S105). When the result indicates that the mode is not selected (S105;NO), in other words, the mode in which paper is discharged onto face down tray 17 is selected, duplex printing cannot be conducted with the order of pages regulated on the paper discharge tray, and, therefore indications representing information of "error" and the "memory capacity shortage" are displayed on liquid crystal display panel 89.

In step S105, if it is determined that the mode in which paper is discharged onto face up tray (FUT) 16a is selected (S105;YES), indications representing "print enable" and "throughput low" are displayed on liquid crystal display panel 89, provided that face up tray (FUT) 16a is mounted on the printer. If face up tray (FUT) 16a is not mounted (S107;NO), indications "error" and "face up tray not mounted" are displayed (S121).

When picture drawing memory 64 has a memory capacity of 2 pages (S133;YES), it is determined whether or not the mode in which paper is discharged onto face up tray (FUT) 16a is selected, and if it is not the mode (S135;NO), the mode in which paper is discharged onto face down tray 17 is set (S143) and indications "print enable" and "throughput low" are displayed on liquid crystal panel 89 (S145).

In step S135, if it is determined to be the mode in which paper is discharged onto face up tray (FUT) 16a (S135;YES), indications "print enable" and "throughput high" are displayed on liquid crystal display panel 89, provided that face up tray (FUT) 16a is mounted on the printer. In other words, in this case, the above-described processings (3-2) (processings in FIGS. 25-33 and FIG. 47) are executed.

If face up tray (FUT) 16a is not mounted (S137;NO), the control proceeds to step S141, and indications "error" and "face up tray not mounted" are displayed.

When picture drawing memory 64 has a memory amount of 3 pages and more (S153;YES), it is determined whether or not the mode in which paper is discharged onto face up tray (FUT) 16a is selected, and if it is determined that the mode in which paper is discharged onto face up tray 16a is not selected (S155:NO), the mode in which paper is discharged onto face down tray 17 is set (S163), with indications "print enable" and "throughput high" being displayed on liquid crystal display panel 89 (S165). In other words in this case the above-stated processings in (3-4) (the processings in FIGS. 37-45, and FIG. 49) are executed.

In step S155, if it is determined that the mode in which paper is discharged onto face up tray (FUT) 16a is selected (S155;YES), indications such as "print enable" and "throughput high" are displayed on liquid crystal display panel 89, provided that face up tray (FUT) 16a is mounted on the printer. In other words, in this case, the above-stated processings in (3-2) (the processings in FIGS. 25-33, and FIG. 47) are executed.

If face up tray (FUT) 16a is not mounted (S157;NO), the control proceeds top step S161 and indications "error" and "face up tray not mounted" are displayed.

Thus, control of paper discharging method is conducted.

Figure 11:
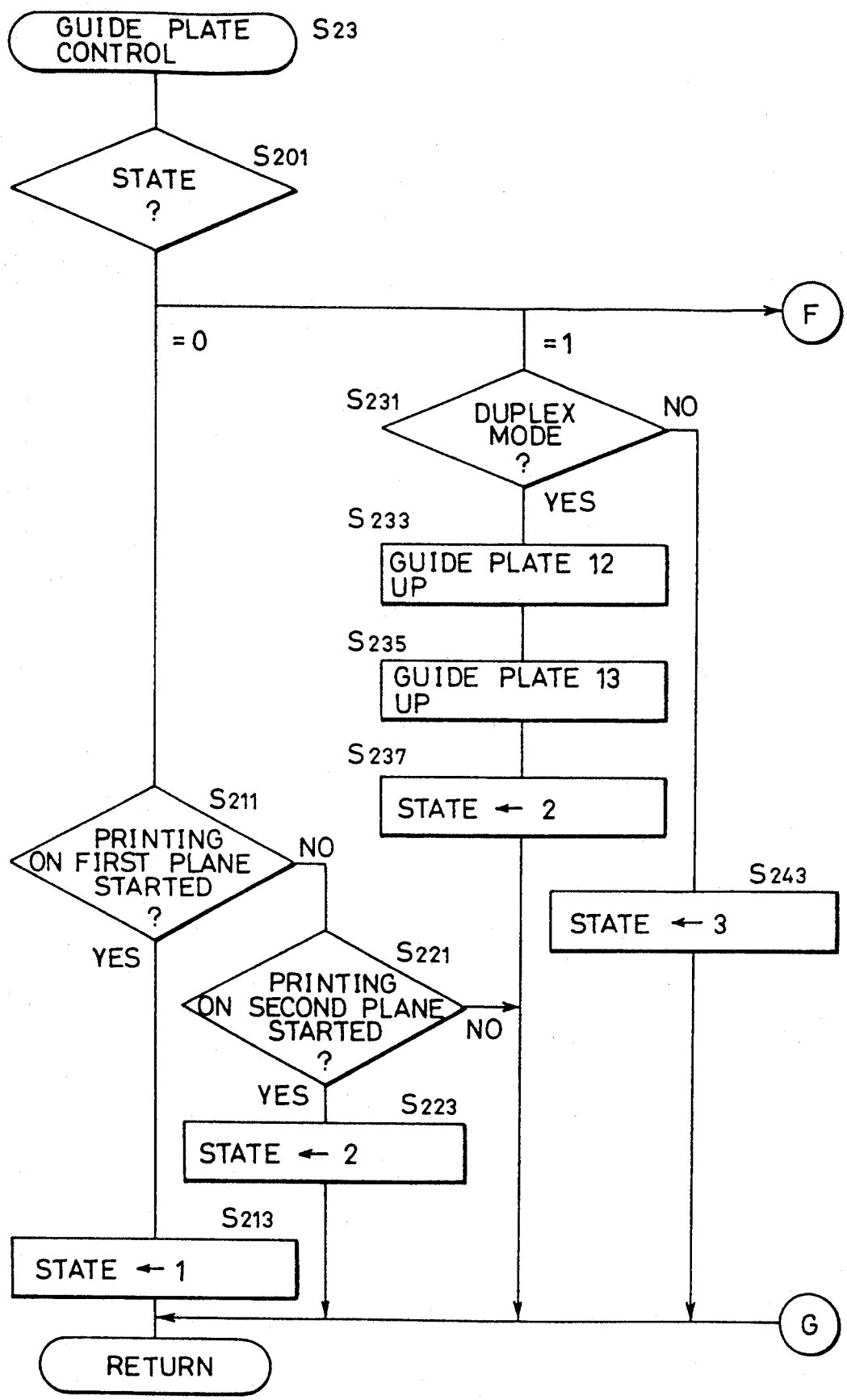
FIG. 11 is a flow chart partially showing control processing of a guide plate executed in the CPU in the engine portion of the printer in accordance with the first embodiment.
Figure 12:
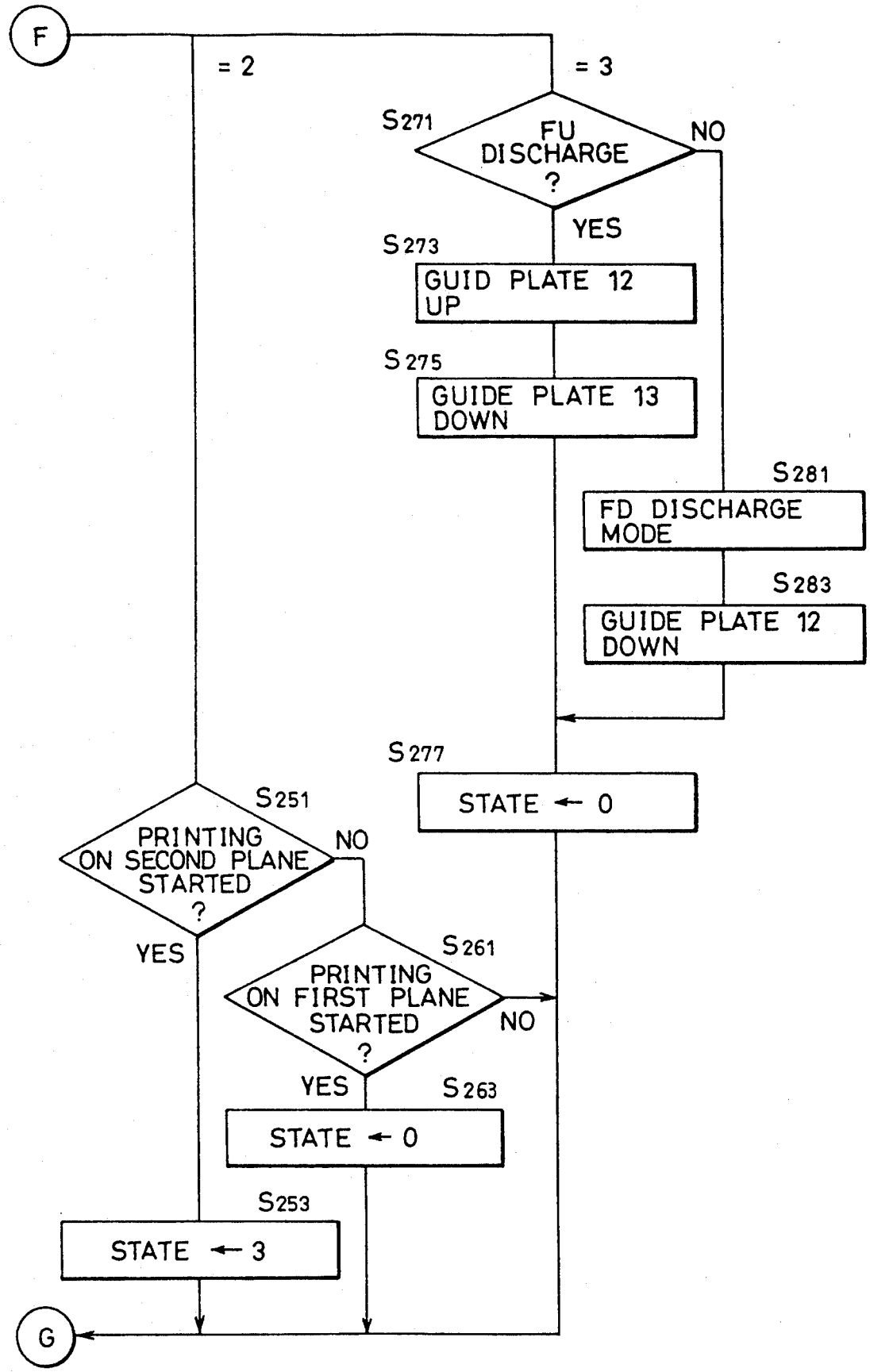
FIG. 12 is a flow chart partially showing control processing of the guide plate executed in the CPU in the engine portion of the printer in accordance with the first embodiment.

(4-3) Guide Plate Control (FIGS. 11-12)

Now, the guide plate control (S23) will be described in conjunction with FIGS. 11 and 12.

The guide plate control is executed as follows in accordance with the value of state corresponding to the feeding state of recording paper.

(4-3-a) State=0

When initiation of printing onto the first plane and second plane of a sheet of recording paper stands by and printing onto the first plane is initiated (S211;YES), the state is set to 1 (S213). This is for sending the sheet of recording paper with its first plane printed onto the side of duplex rollers 15 in the duplex mode (see S233-S237), and for discharging the sheet of recording paper with its first plane printed onto a designated discharge tray in the one side mode (see S271-S281).

When printing onto the second plane of the sheet of recording paper is initiated (S221;YES) in other words printing onto the second plane of the sheet of recording paper supplied from the side of the paper re-supply path 24 is initiated, the state is set to 2 (S223). This is for waiting for printing processing onto the first plane of the sheet of recording paper supplied from the side of paper tray 18 (see S261).

(4-3-b) State=1

When the duplex mode is set (S231;YES), guide plates 12 and 13 are set to their upper positions (S233-S235). Thus, the sheet of recording paper with its first plane printed is sent to the side of duplex rollers 15 and feeding of the paper into the paper re-supply path 24 is permitted. In this case, the state is set to 2 (S237), and the printing processing onto the first plane or second plane of the sheet of recording paper is in the state of waiting.

When the duplex mode is not set (S232;NO), the state is set to 3 (S243). Thus, the sheet of recording paper with its first plane printed can be discharged onto a designated discharged tray (see S271-S281).

(4-3-c) State=2

Initiation of printing onto the second plane or first plane of a sheet of recording paper stands by, and when the printing onto the second plane is initiated (S251;YES), the state is set to 3 (S253). Thus, the sheet of recording paper with its both planes printed can be discharged onto a designated discharge tray (see S271-S281).

When printing onto the first plane of the sheet of recording paper is initiated (S261;YES), in other words when printing onto the first plane of the sheet of recording paper supplied from the side of paper tray 181 is initiated with the previous recording paper standing by on the side of the paper re-supply path 24, the state is set to 0 (S263). This is to make printing processing onto the second plane of the sheet of recording paper on the side of the paper re-supply path 24 stand by (see S221), or to make printing processing onto the first plane of the sheet of recording paper subsequently supplied from paper tray 18 stand by (see S211).

(4-3-d) State=3

When the mode in which paper is discharged onto face up tray (FUT) 16a is set (S271;YES), guide plate 12 is set to its upper position, and guide plate 13 is set to its low position (S273, S275), the sheet of recording paper with its printing completed (the sheet of recording paper with both planes printed in the duplex mode, and the sheet of recording paper with its first plane printed in the one side mode) is permitted to be discharged onto face up tray (FUT) 16a, and the state is set to 0 (S277).

When the mode in which the paper is discharged onto face up tray (FUT) 16a is not set (S271;NO), the mode in which the paper is discharged onto face down tray (FDT) 17 is set (S281), guide plate 12 is set at its lower position (S283), the sheet of recording paper with its printing completed is permitted to be discharged onto face down tray (FDT) 17, and then the state is set to 0 (S277).

Control of the guide plates is thus conducted.

Figure 13:
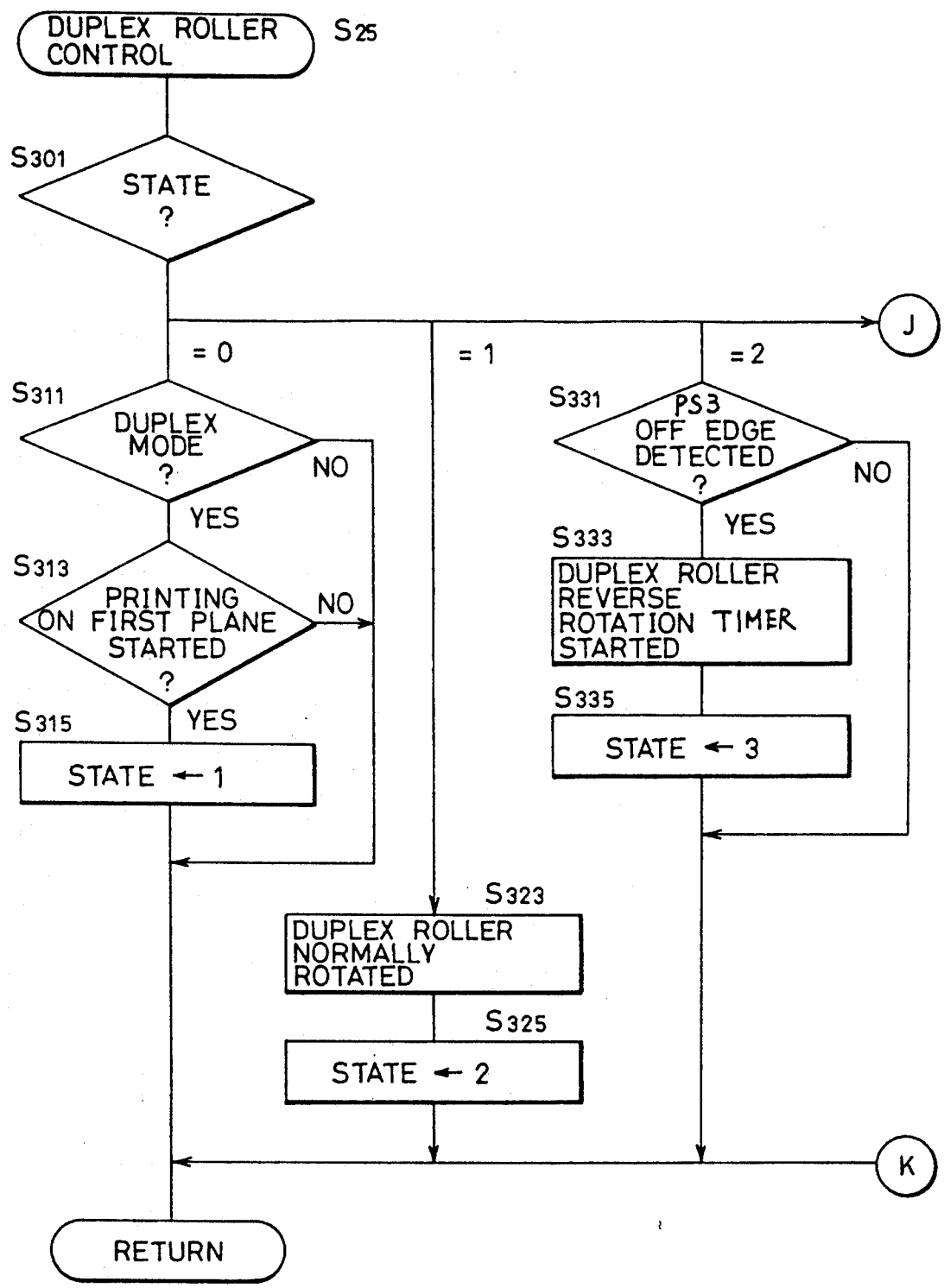
FIG. 13 is a flow chart partially showing control processing of duplex rollers executed in the CPU in the engine portion of the printer in accordance with the first embodiment.
Figure 14:
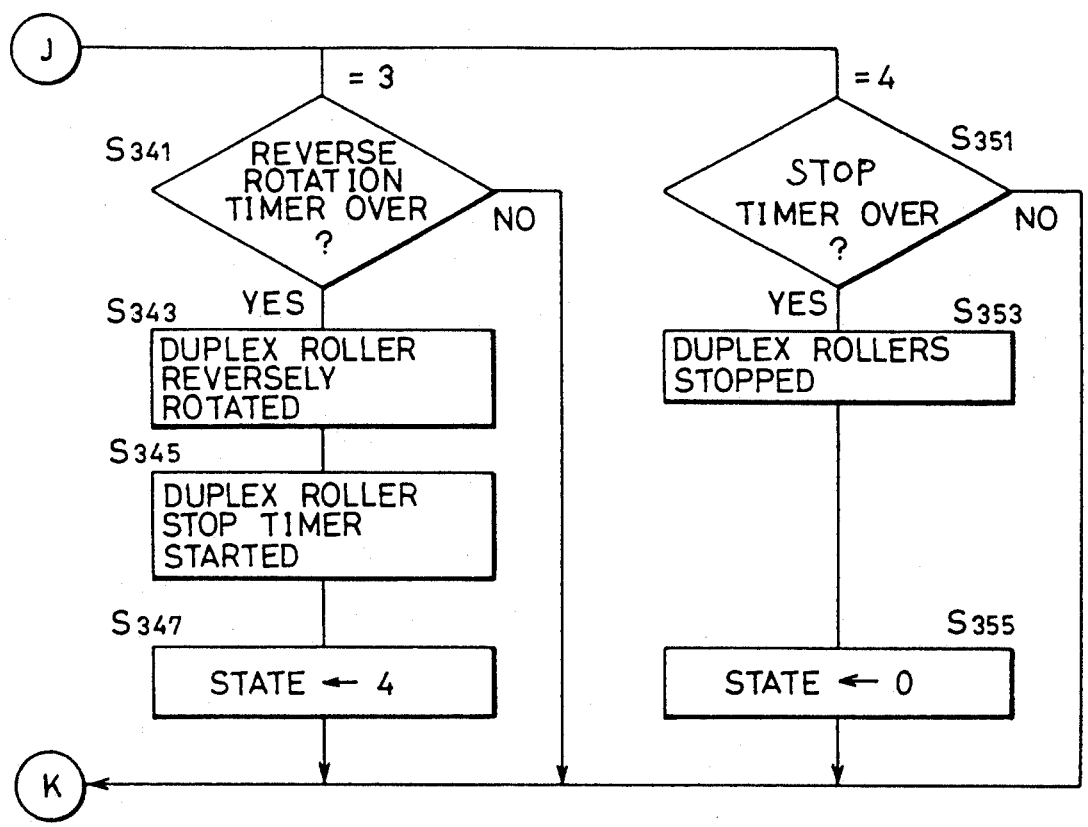
FIG. 14 is a flow chart partially showing control processing of duplex rollers executed in the CPU in the engine portion of the printer in accordance with the first embodiment.

(4-4) Control of Duplex Rollers (FIGS. 13-14)

The control of duplex rollers (S25) will be described in conjunction with FIGS. 13 and 14.

The control of the duplex rollers is conducted as follows in accordance with the value of state corresponding to the feeding stage of a sheet of recording paper.

(4-4-a) State=0

In the duplex mode (S311;YES), when printing onto the first plane of a sheet of recording paper is initiated (S313;YES), the state is set to 1 (S315).

(4-4-b) State=1

Duplex rollers 15 are normally rotated (S323). Thus, the sheet of recording paper with its first plane printed is permitted to be sent into the hollow portion created between face up tray (FUT) 16a and midway tray plate 16b. The state is set to 2 (S325).

(4-4-c) State=2

When it is determined that the trailing edge of a sheet of recording paper gets out of heat rollers 23 and the off edge of sensor PS3 (the state of signal is switched from on to off) (S331;YES), the duplex roller reverse rotation timer is started (S333), and the state is set to 3 (S335). The reverse rotation timer is set at time until the vicinity of the trailing edge of the sheet of recording paper is held between duplex rollers 15.

(4-4-d) State=3

Waiting for time up of the duplex roller reverse timer and when time is up (S341;YES), duplex rollers 15 are reversely rotated (S343). Thus, the sheet of recording paper in the hollow portion is sent into the paper re-supply path 24 with its trailing edge side first.

The duplex roller stop timer is also started (S345), and the state is set to 4 (S347).

(4-4-e) State=4

With the lapse of time sufficient for the above-stated sheet of recording paper to get out from duplex rollers 15, when the duplex roller stop timer is time-up (S351;YES), duplex rollers 15 are stopped (S353) and the state is set to 0 (S355).

Control of the duplex rollers are thus conducted.

(5) Second Embodiment

A second embodiment of the present invention will be described in conjunction with FIGS. 15-21. The mechanism and the operation panel of the second embodiment apparatus are identical to those of the first embodiment, and the circuit corresponding to FIGS. 3-5 among the structure/function of the control circuit are identical to those of the first embodiment, and, therefore, description will not be repeated on those. Hereinafter, different points will mainly be described.

(5-1) Control Circuit

Figure 15:
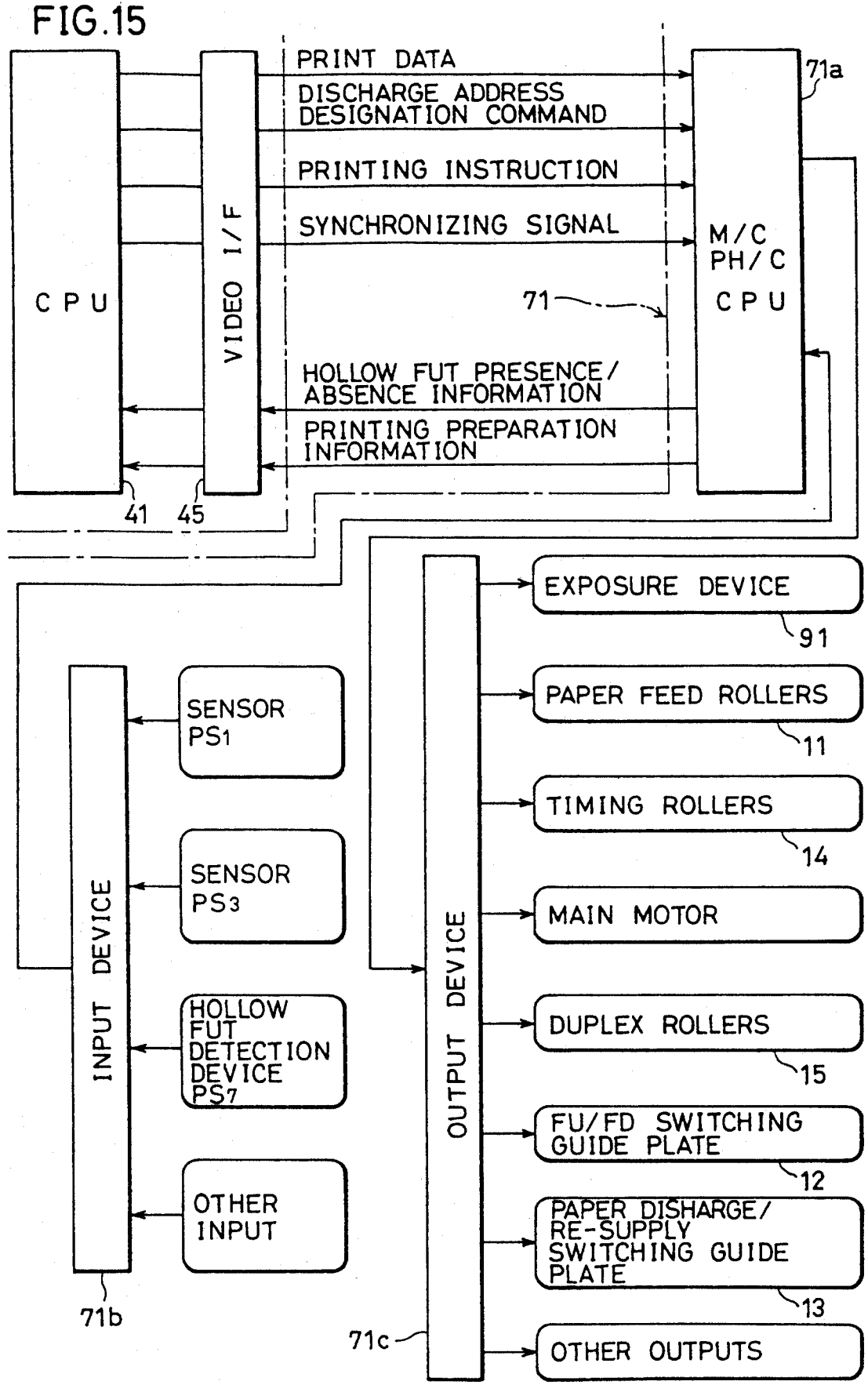
FIG. 15 is a block diagram showing a function of the engine portion of the control circuit of a printer in accordance with the second embodiment.

A circuit corresponding to FIG. 6 of the first embodiment apparatus is a control circuit in the second embodiment apparatus and is illustrated in FIG. 15.

As shown in FIG. 15, the second embodiment apparatus is also formed of two control portions constituting engine portions 7, in other words engine control portion 71A and print head control portion 71B (see FIG. 3) which are formed of a single CPU 71A.

Also, a discharge address designation command as well as printing instruction, printing data, and synchronizing signals are transmitted from the CPU 41 of the controller control portion 40 of the second embodiment apparatus to CPU 71a through video I/F45. In other words, the discharge address, etc. of a printed sheet of recording paper is controlled by CPU 41 in the second embodiment apparatus.

Information representing whether or not face up tray (FUT) 16a and midway tray plate (16b) are mounted to the printer (hollow FUT presence/absence information) is transmitted from CPU 71a to CPU41.

(5-2) Control by CPU 41

Control executed by the CPU 41 of the second embodiment apparatus will be described in conjunction with FIGS. 16-20

(5-2-a) Outline of Control

Figure 16:
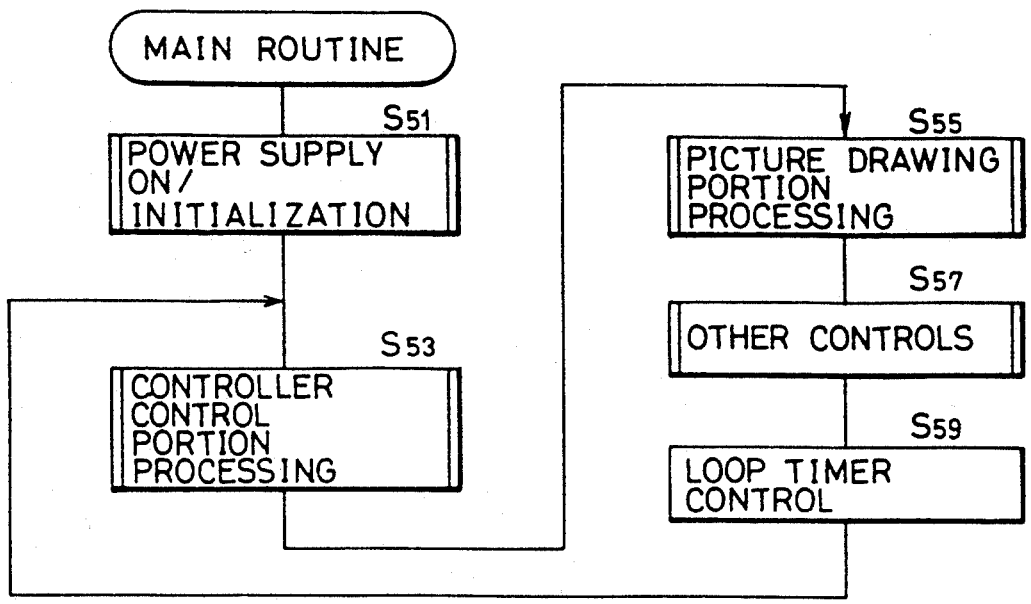
FIG. 16 is a flow chart showing the main routine of processing in a CPU in the controller portion of the control circuit of the printer in accordance with the second embodiment.

As shown in FIG. 16, CPU 41 starts processing by turn-on of the power supply, and then executes setting of initialization state (S51).

Then, CPU 41 repeatedly conducts controller control portion processing (S53), picture drawing control portion processing (S55) and processings other than these processings (S57) for every constant time period controlled by a loop timer (S59).

Among these processings, the picture drawing control portion processing (S55) and the other processings (S57) have been already described in conjunction with FIGS. 3-5 concerning the first embodiment, and therefore, the description will not be provided thereon.

Figure 17:
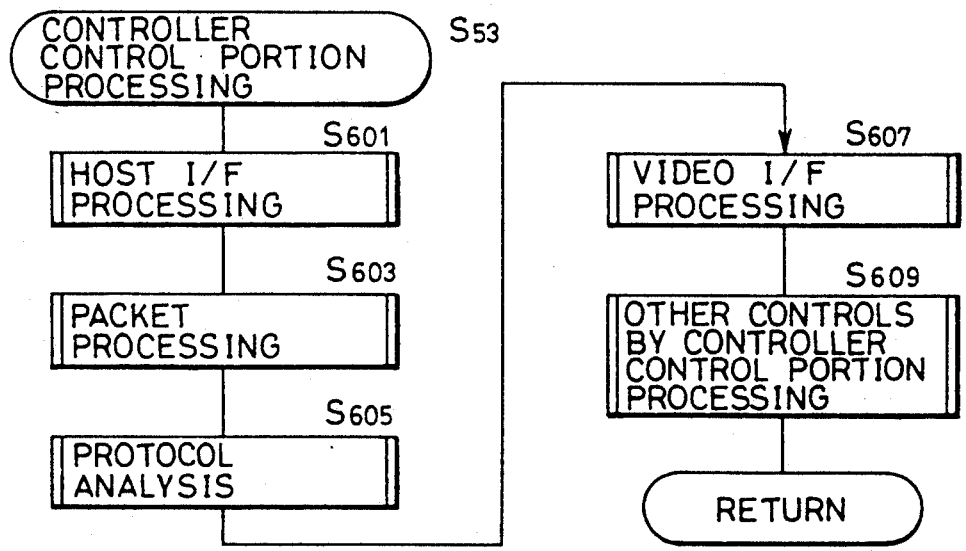
FIG. 17 is a flow chart showing controller control portion processing executed in the CPU in the controller portion of the control circuit of the printer in accordance with the second embodiment.

In the controller control portion processing (S53), as shown in FIG. 17, host I/F processing (S601), packet processing (S603), protocol analysis (S605), video I/F processing (S607), and controller control portion processing (S609) other than these processings are executed. Among these processings, the host I/F processing (S601), the packet processing (S603), the protocol analysis (S605), and the other controller control portion processing (S609) haven been roughly described in conjunction with FIGS. 3-4 concerning the first embodiment, which are known, and therefore, description will not be repeated thereon.

Figure 18:
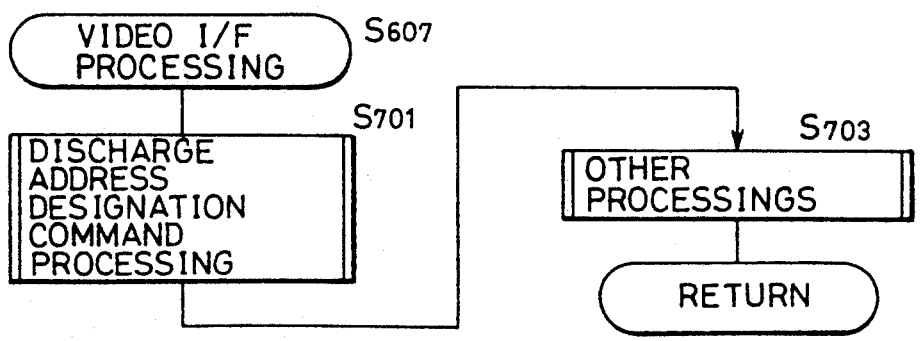
FIG. 18 is a flow chart showing video I/F processing executed in the CPU in the controller portion of the control circuit of the printer in accordance with the second embodiment.

Also in the video I/F processing (S607), as shown in FIG. 18, discharge address designation command processing (S701), and video I/F processing (S703) other than the discharge address designation command processing are executed.

Among these processings, the other video I/F processing (S703) have been roughly described in conjunction with FIGS. 6, etc. in relation with the first embodiment, and, therefore, description will not be provided thereon.

(5-2-b) Discharge Address Designation Command Processing

Figure 19:
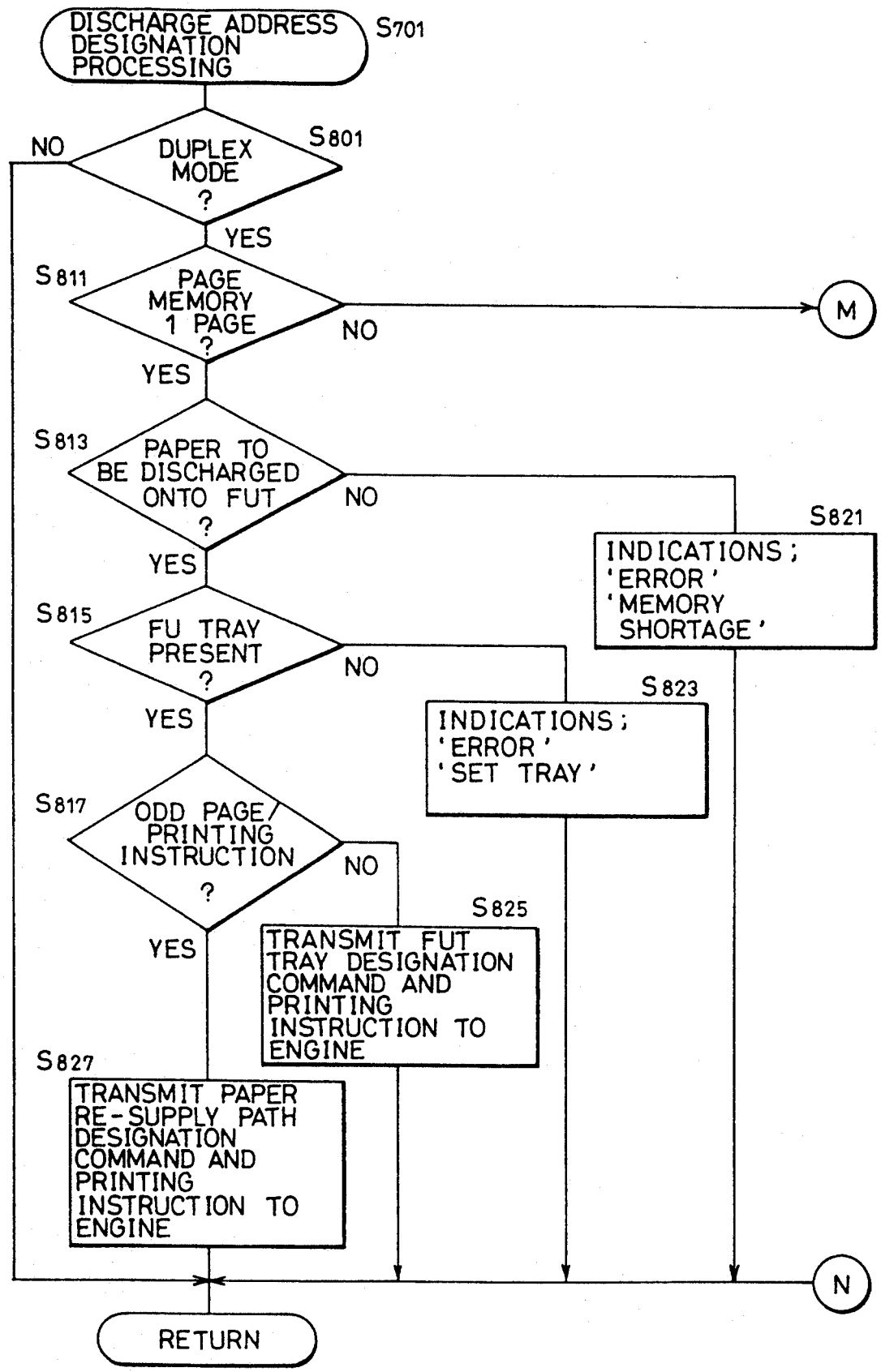
FIG. 19 is a flow chart partially showing discharge address designation processing executed in the CPU in the controller of the control circuit of the printer in accordance with the second embodiment.
Figure 20:
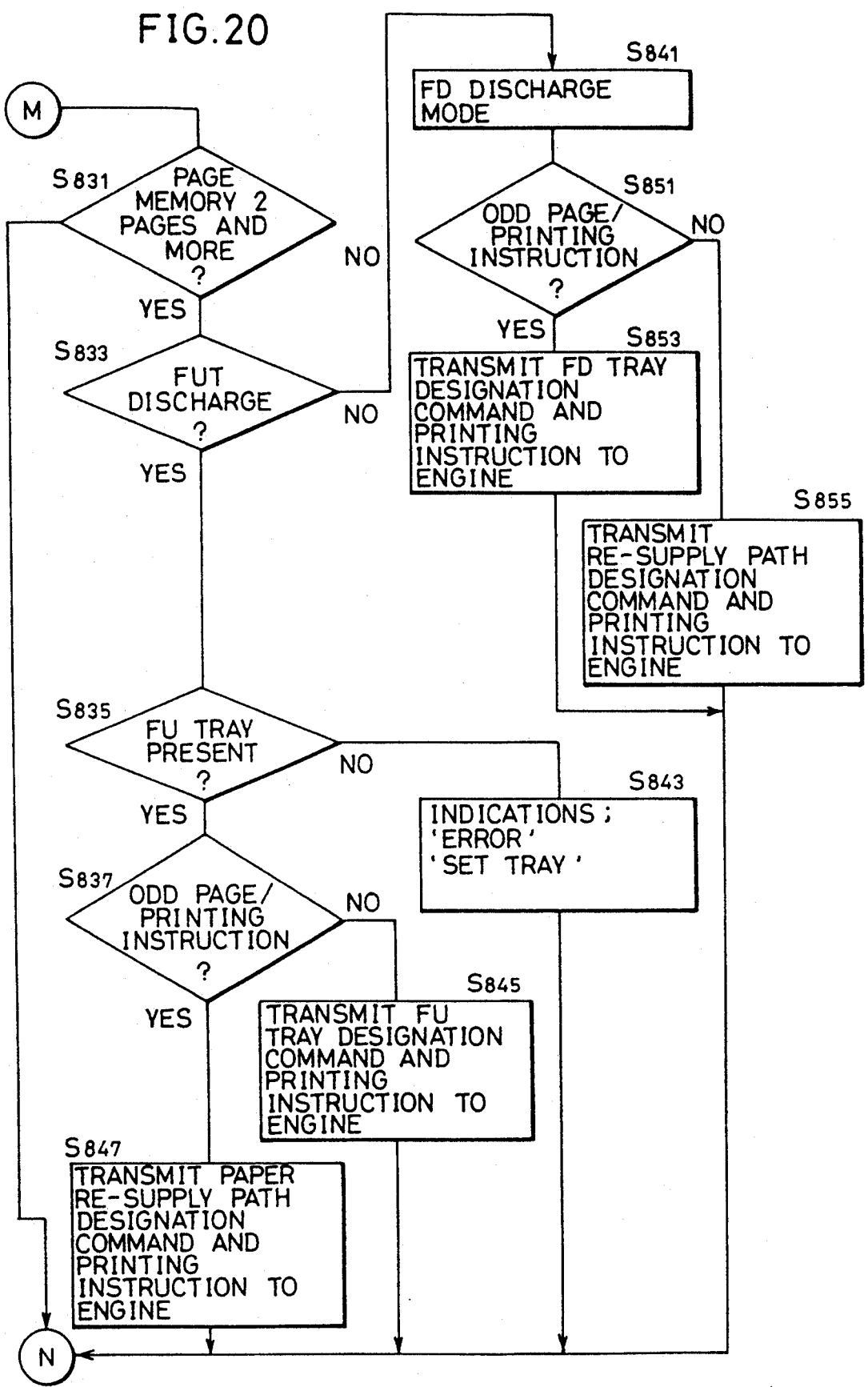
FIG. 20 is a flow chart partially showing discharge address designation processing executed in the CPU in the controller portion of the control circuit of the printer in accordance with the second embodiment.
Figure 21:
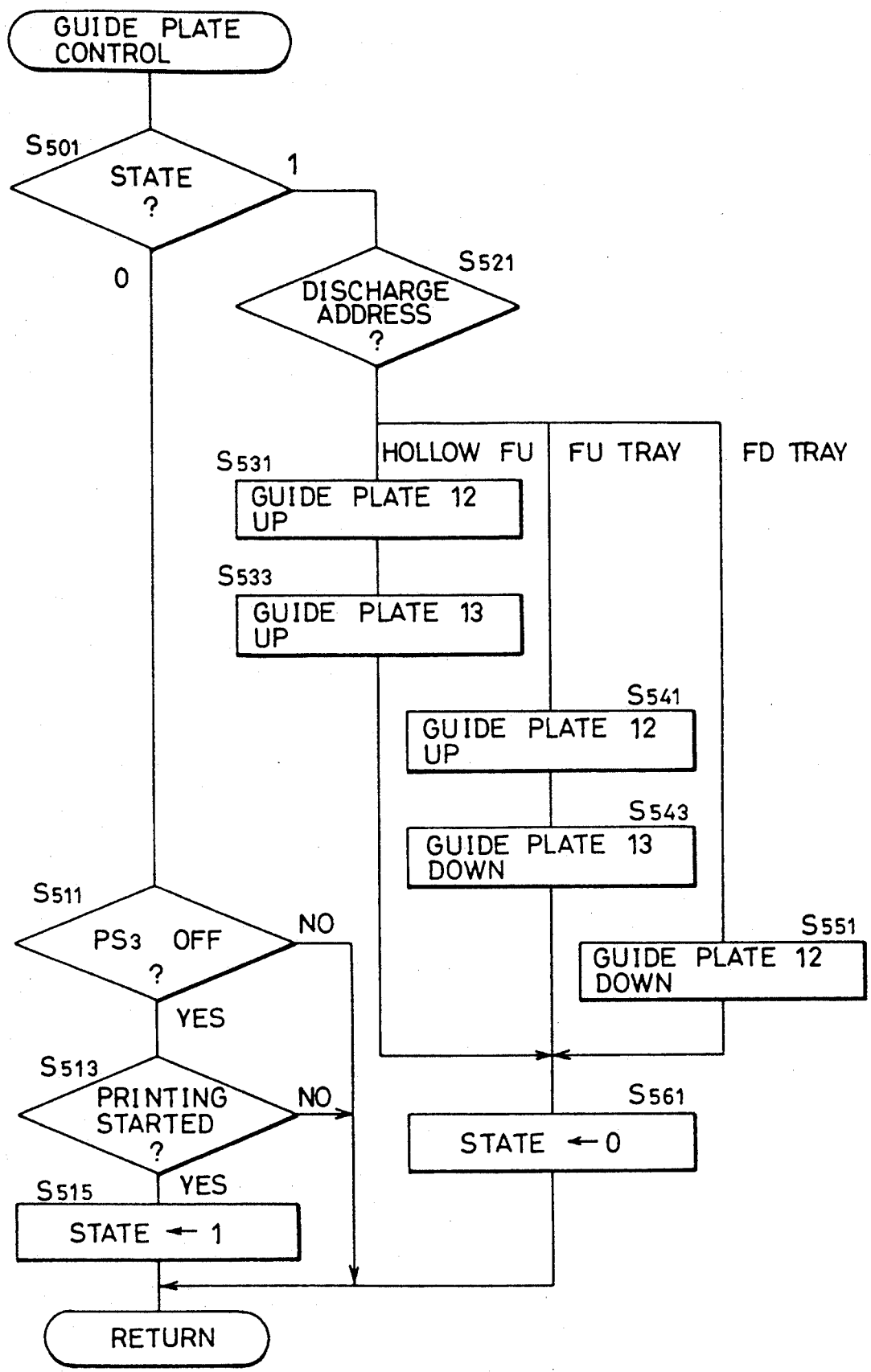
FIG. 21 is a flow chart showing control processing of a guide plate executed in the CPU in the engine portion of the control circuit of the printer in accordance with the second embodiment.

The discharge address designation processing (S701) will be described in conjunction with FIGS. 19-20.

The discharge address designation processing is executed when the duplex mode is set (S801;YES). In other words, when the duplex mode is not set (S801;NO), this processing is not substantially executed and the control immediately returns to the video I/F processing (S607).

It is determined whether or not picture drawing memory 64 has a memory capacity of 1 page (S811). If the result indicates that the memory capacity is 1 page (S811;YES), the control proceeds to step S813, and it is determined whether or not the mode in which paper is discharged onto face up tray (FUT) 16a is selected.

In step S813, when the mode in which paper is discharged onto face up tray (FUT) 16a is not selected (S813;NO), duplex printing cannot be performed with the order of pages regulated on face down tray (FDT) 17, and therefore, the control proceeds to step S821 to make indications "error" and "memory capacity shortage" on liquid crystal display panel 89. In step S813, if it is determined that the mode in which paper is discharged onto face up tray (FUT) 16a is selected (S813;YES), the control proceeds to S817 provided that the face up tray is mounted in the printer (S815;YES), and determination is made whether or not printing instruction is an instruction of printing data for an odd page or data for an even page.

If the result indicates that the instruction is the one for an odd page (S817;YES), a command for feeding the printed sheet of recording paper onto the side of the paper re-supply path 24, and an instruction of printing data for the odd page are transmitted to engine portion 7 (S827). Thus, the sheet of recording paper with its first plane printed with the data on the odd page is sent to the paper re-supply path 24 through duplex rollers 15 etc. in the printer engine.

If the instruction is an instruction of printing the data for an even page (S817;NO), a command for discharging the printed sheet of recording paper onto the side of face up tray (FUT) 16a, and an instruction of printing the data for the even page are transmitted to engine portion 7 (S825). Thus, the sheet of recording paper with its second plane printed with the data for the even page is guided by guide plate 12 set at the upper position and guide plate 13 set at the lower position to be discharged onto the side of face up tray (FUT) 16a.

In step S815, if it is determined that the face up tray is not mounted in the printer (S815;NO), the control proceeds to step S823 to make indications "error" and "face up tray absent (or urging setting of face up tray)" on liquid crystal display panel 89.

When picture drawing memory 64 has a capacity of 2 pages and more (S831;YES), it is determined whether or not the mode in which the paper is discharged onto face up tray (FUT) 16a is selected in steps S833. If the result indicates that the mode is not the one (S833;NO), the mode in which the paper is discharged onto face down tray (FDT) 17 is set (S841) and it is determined in step S851 whether or not the printing instruction is an instruction of printing data for an odd page or that for an even page.

If the result of the determination indicates that the instruction is for the data for the odd page (S851;YES), a command for discharging the printed sheet of recording paper onto face down tray (FDT) 17, and an instruction of printing the data for the odd page are transmitted to engine portion 7 (S853). Thus, in the printer engine, the sheet of recording paper with its second plane printed with the data for the odd page is guided by guide plate 12 set at the lower position and discharged onto the side of face down tray (FDT) 17.

If the instruction is the one of printing data for an even page (S851;NO), a command for sending the printed sheet of recording paper onto the side of the paper re-supply path 24 and an instruction of printing the data for the even page are transmitted to engine portion 7 (S855). Thus, in the printer engine, the sheet of recording paper with its first plane printed with the data for the even page is fed into the paper re-supply path 24 through duplex rollers 15, etc.

In step S833, if it is determined that the mode in which the paper is discharged onto face up tray (FUT) 16a is selected (S833;YES), the control proceeds to step S837, provided that the face up tray is mounted in the printer (S835;YES), and it is determined whether the printing instruction is an instruction of printing data for an odd page or that for an even page.

If the result indicates that the instruction is of printing the data for the odd page (S837;YES), a command for sending the printed recording paper onto the side of the paper re-supply path 24 and an instruction of printing the data for the odd page are transmitted to engine portion 7 (S847). Thus, in the printer engine, the sheet of recording paper with its first plane printed with the data for the odd page is fed to the paper re-supply path 24 through duplex rollers 15, etc.

If the instruction is of printing the even page (S837;NO), a command for discharging the printed sheet of recording paper onto the face up tray (FUT) 16a, and an instruction of printing the data for the even page are transmitted to engine portion 7 (S845). Thus in the printer engine, the sheet of recording paper with its second plane printed with the data for the even page is guided by guide plate 12 set at its upper position and guide plates 13 set at its lower position and discharged onto the side of face up tray (FUT) 16a.

In step S835, if it is determined that the face up tray is not mounted in the printer (S835;NO), the control proceeds to step S843 to make indications "error" and "face up tray absent (or set face up tray)" on liquid crystal panel 89.

As described above, the discharged address designation command processing is conducted.

(5-3) control by CPU 71a

Now, control of guide plates which is control executed by the CPU 71a of the second embodiment apparatus and different from that of the first embodiment apparatus will be described in conjunction with FIG. 12. This guide plate control is executed in step S23 in FIG. 7.

The state is determined (S501). In the initialization state, the state is set to 0.

(5-3-a) State=0

With sensor PS3 placed immediately before guide plate 12 being off (S511;YES), when printing is initiated (S513;YES), the state is set to 1 (S515).

(5-3-a) State=1

In step S521, the incoming discharge address designation command transmitted from the side of CPU 41 (see FIGS. 19-20/S827, S825, S847, S845, S853, S855) is determined.

If the result indicates that a command for the paper re-supply path is transmitted (see FIGS. 19-20/S827, S847, S855), guide plate 12 is set to its upper position and guide plate 13 is set to the lower position (S531, S533). Thus, the sheet of recording paper is fed to paper re-feed rollers 15. Then, the state is set to 0 (S561).

If the command is for FU tray (see FIGS. 19 and 20/S825, S845), guide plate 12 is set to its upper position and guide plate 13 is set to its lower position (S541, S543). The sheet of recording paper is thus discharged onto the side of face up tray (FUT) 16a.

If the command is for FD tray (see FIG. 20/S853), guide plate 12 is set to its lower position (S551). The sheet of recording paper is thus discharged onto the side of face down tray (FDT) 17.

The guide plates are thus controlled.

(6) Other Methods of Control

In the above-described first and second embodiments, control is made so that paper is basically discharged onto face up tray 16a in duplex printing, and if picture drawing memory 64 affords capacity, paper is discharged onto a designated one of face up tray 16a and face down tray 17.

However, in place of the above-stated first and second embodiments, control can be made so that paper is always discharged onto face up tray 16a in duplex printing, and duplex printing is prohibited if face up tray 16a is not provided, thereby reducing capacity needed by picture drawing memory 64.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus for forming images on opposing planes of a sheet of paper based on image data sequentially transmitted on a page-by-page basis, comprising:
    storage means for storing image data on a page-by-page basis;
    image forming means for forming an image on a sheet of recording paper based on image data read out from said storage means; and
    changing means for changing an order for the image data to be read out from said storage means based on a storage capacity of said storage means.

2. An image forming apparatus as recited in claim 1, wherein
    said changing means changes the order of the image data to be read out among cases in which the storage capacity of said storage means corresponds to image data for one page, the storage capacity of said storage means corresponds to image data for two pages, and the storage capacity of said storage means corresponds to image data for three pages.

3. An image forming apparatus for forming images on opposing first and second planes of a sheet of paper based on image data sequentially transmitted on a page-by-page basis, comprising:
    storage means for storing image data on a page-by-page basis;
    image forming means for forming an image on a sheet of recording paper based on image data read out from said storage means;
    first paper feeding means for feeding a sheet of paper with no image formed thereon to said image forming means with its first plane as an image forming plane;
    second paper feeding means for feeding a sheet of recording paper with an image formed on its first plane to said image forming means once again with its second plane as an image forming plane;
    first paper discharge means for discharging the image-formed sheet with its first plane facing upward;
    second paper discharge means for discharging the image-formed sheet with its first plane facing downward;
    switching means for switching where the image-formed sheet of paper is to be sent among said first paper discharge means, said second paper discharge means and said image forming means; and
    control means for controlling said image forming means, said first paper feeding means, said second paper feeding means and said switching means based on a storage capacity of said storage means so that time required for forming images for all said transmitted image data is minimized.

4. An image forming apparatus as recited in claim 3, wherein
    said control means further includes changing means for changing an order of the image data to be read out among cases in which the storage capacity of said storage means corresponds to image data for one page, the storage capacity of said storage means corresponds to image data for two pages, and the storage capacity of said storage means corresponds to image data for three pages.

5. An image forming apparatus as recited in claim 3, wherein
    said second paper feeding means includes paper accommodating means and feeds the sheet of paper with the image formed on its first plane to said image forming means after once accommodating means with its first plane facing upward.

6. An image forming apparatus for forming images on opposing planes of a sheet of paper based on image data sequentially transmitted on a page-by-page basis, comprising:
    storage means for storing image data on a page-by-page basis;
    image forming means for forming an image on a sheet of recording paper based on image data read out from said storage means;
    a face up tray detachable from a body of the apparatus and capable of receiving the sheet of paper with a plane, on which an image is formed last, facing upward; and
    changing means for changing an order of image data to be read out from said storage means based on whether or not said face up tray is mounted to the body of the apparatus.

7. An image forming apparatus as recited in claim 6, wherein said face up tray is detachable to a side of the body of the apparatus.

8. An image forming apparatus as recited in claim 7, further comprising:
    a face down tray attached on a top of the body of the apparatus for receiving the sheet of paper with the plane, on which an image is formed last, facing downward, wherein
    the apparatus changes the order of reading image data based on a storage capacity of said storage means when said face up tray is not mounted to the side of the body of the apparatus.

9. An image forming apparatus for forming images on opposing first and second planes of a sheet of paper based on image data sequentially transmitted on a page-by-page basis, comprising:
    storage means for storing image data on a page-by-page basis;

image forming means for forming an image on a sheet of paper based on image data read out from said storage means;

first paper feeding means for feeding a sheet of paper with no image formed thereon to said image forming means with its first plane as an image forming plane;

second paper feeding means for feeding a sheet of paper with an image formed on its first plane to said image forming means once again with its second plane as an image forming plane;

a first paper discharge tray attachable to and detachable from a body of the apparatus for receiving a sheet of paper with its first plane facing upward;

a second paper discharge tray for receiving an image-formed sheet with its first plane facing downward; image formed sheet is to be sent among said first paper discharge tray, said second paper discharge tray and said image forming means; and control means for controlling said image forming means, said first paper feeding means, said second paper feeding means, and said switching means based on whether or not said first paper discharge tray is mounted to the apparatus so that time required for forming images for all of said transmitted image data is minimized.

10. An image forming apparatus as recited in claim 9, wherein said first paper discharge tray is attachable to and detachable from a side of the body of the apparatus.

11. An image forming apparatus for forming images on opposing planes of a sheet of paper based on image data sequentially transmitted on a page-by-page basis, comprising:

storage means for storing image data on a page-by-page basis;

image forming means for forming an image on a sheet of paper based on image data read out from said storage means;

a face up tray attachable to and detachable from a body of the apparatus for receiving a sheet of paper with its plane, on which an image is formed last, facing upward; and changing means for changing an order of reading image data from said storage means based on a storage capacity of said storage means and whether or not said face up tray is mounted to the apparatus.

12. An image forming apparatus as recited in claim 11, wherein said changing means changes the order of reading image data among cases in which the storage capacity of said storage means corresponds to image data for one page, the storage capacity of said storage means corresponds to image data for two pages, and the storage capacity of said storage means corresponds to image data for three pages.

13. An image forming apparatus as recited in claim 11, further comprising:

a face down tray attached on a top of the body of the apparatus for receiving a sheet of paper with its plane, on which an image is formed last, facing downward;

selection means for selecting one of said face up tray and said face down tray; and detection means for detecting the storage capacity of said storage means, wherein said changing means changes the order of image data to be read out based on a selection output of said selection means and a detection output of said detection means.

14. An image forming apparatus as recited in claim 11, wherein said face up tray is attachable to and detachable from a side of the body of the apparatus.

15. An image forming apparatus for forming images on opposing first and second planes of a sheet of paper based on image data sequentially transmitted on a page-by-page basis, comprising:

storage means for storing image data on a page-by-page basis;

detection means for detecting a storage capacity of said storage means;

image forming means for forming an image on a sheet of paper based on image data read out from said storage means;

first paper feeding means for feeding a sheet of paper with no image formed thereon with its first plane as an image forming plane to said image forming means;

second paper feeding means for feeding a sheet of paper with an image formed on its first plane once again to said image forming means with its second plane as an image forming plane;

a first paper discharge tray attachable to and detachable from a body of the apparatus for receiving a sheet of paper with its first plane facing upward;

a second paper discharge tray for receiving an image-formed sheet of paper with its first plane facing downward;

selection means for selecting one of said first paper discharge tray and said second paper discharge tray; and indication means for indicating information concerning minimum time required for forming images for all of said transmitted image data based on a detection output of said detection means and a selection output of said selection means.

16. An image forming apparatus as recited in claim 15, further comprising:

switching means for switching where an image-forming sheet of paper is to be sent among said first paper discharge tray, said second paper discharge tray, and said image forming means; and control means for controlling said image forming means, said first paper feeding means, said second paper feeding means and said switching means so that time required for forming images for all of said transmitted image data is minimized.

17. An image forming apparatus as recited in claim 15, wherein said indication means includes means for indicating when said first paper discharge tray is not mounted to said body of said apparatus, and wherein selection of said first paper discharge tray by said selection means is prohibited.

* * * * *

UNITED STATES PATENT AND TRADEMARK OFFICE
CERTIFICATE OF CORRECTION

PATENT NO. : 5,241,397

DATED : August 31, 1993

INVENTOR(S) : Tatsutoshi Yamada

It is certified that error appears in the above-identified patent and that said Letters Patent is hereby corrected as shown below:

In col. 2, line 13, delete "a".

In col. 9, line 42, delete "10".

In col. 20, line 54, change "(5-3-a)" to --(5-3-b)--.

In col. 22, line 30 (Claim 5, line 6), after "accommodating" insert --the sheet of paper in said paper accommodating--.

In col. 23, line 17 (Claim 9, line 23), before "image" insert --switching means for switching where the--.

In col. 24, lines 47 and 48 (Claim 16, lines 3 and 4), change "forming" to --formed--.

Signed and Sealed this

Twenty-ninth Day of March, 1994

Attest:

*Attesting Officer*

BRUCE LEHMAN

*Commissioner of Patents and Trademarks*